US010893292B2

(12) United States Patent
Jeong et al.

(10) Patent No.: US 10,893,292 B2
(45) Date of Patent: Jan. 12, 2021

(54) ELECTRONIC CIRCUIT AND ELECTRONIC DEVICE PERFORMING MOTION ESTIMATION THROUGH HIERARCHICAL SEARCH

(71) Applicant: Samsung Electronics Co., Ltd., Suwon-si (KR)

(72) Inventors: Yowon Jeong, Anyang-si (KR); Giwon Kim, Seongnam-si (KR); Juwon Byun, Hwaseong-si (KR); Wonseop Song, Seoul (KR); Jeehoon An, Seoul (KR); Jungyeop Yang, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/504,916

(22) Filed: Jul. 8, 2019

(65) Prior Publication Data

US 2020/0195964 A1 Jun. 18, 2020

(30) Foreign Application Priority Data

Dec. 18, 2018 (KR) ........................ 10-2018-0164425

(51) Int. Cl.

| | |
|---|---|
| ***H04N 19/00*** | (2014.01) |
| ***H04N 19/53*** | (2014.01) |
| ***H04N 19/112*** | (2014.01) |
| ***H04N 5/14*** | (2006.01) |
| ***H04N 19/172*** | (2014.01) |

(Continued)

(52) U.S. Cl.

CPC ............. *H04N 19/53* (2014.11); *H04N 5/145* (2013.01); *H04N 19/112* (2014.11); *H04N 19/159* (2014.11); *H04N 19/172* (2014.11); *H04N 19/182* (2014.11)

(58) Field of Classification Search

CPC .... H04N 19/53; H04N 19/112; H04N 19/159; H04N 19/172; H04N 19/182; H04N 5/145

See application file for complete search history.

(56) References Cited

U.S. PATENT DOCUMENTS

| | | | |
|---|---|---|---|
| 5,761,398 | A | 6/1998 | Legall |
| 6,363,117 | B1 | 3/2002 | Kok |
| 7,346,109 | B2 | 3/2008 | Nair et al. |

(Continued)

*Primary Examiner* — Zhihan Zhou

(74) *Attorney, Agent, or Firm* — Harness, Dickey and Pierce, P.L.C.

(57) ABSTRACT

An electronic circuit includes a block determinator, a candidate selector, and a motion vector generator to perform motion estimation. The block determinator determines a current block and candidate blocks with regard to each of decimated images generated from an original image, wherein the block determinator determines first candidate blocks based on a location of the current block without a full search for all pixels with regard to a first decimated image of the lowest resolution. The candidate selector selects second candidate blocks which are some of the first candidate blocks with regard to a second decimated image of the highest resolution, such that the block determinator determines the second candidate blocks with regard to the original image. The motion vector generator generates a motion vector for the current block based on one reference patch determined from reference patches indicated by candidate motion vectors of the second candidate blocks.

20 Claims, 27 Drawing Sheets

(51) Int. Cl.
*H04N 19/182* (2014.01)
*H04N 19/159* (2014.01)

(56) References Cited

U.S. PATENT DOCUMENTS

| | | | | |
|---|---|---|---|---|
| 7,362,808 | B2 | 4/2008 | Kang | |
| 7,433,407 | B2 | 10/2008 | Lee et al. | |
| 8,494,054 | B2 | 7/2013 | Nair et al. | |
| 2004/0114688 | A1* | 6/2004 | Kang | H04N 19/53 375/240.12 |
| 2005/0074064 | A1* | 4/2005 | Lee | H04N 5/145 375/240.16 |
| 2005/0135482 | A1* | 6/2005 | Nair | H04N 7/014 375/240.16 |
| 2008/0260033 | A1* | 10/2008 | Austerlitz | H04N 19/56 375/240.16 |
| 2010/0079606 | A1* | 4/2010 | Batur | H04N 5/23254 348/208.6 |
| 2011/0255596 | A1 | 10/2011 | Chen et al. | |

* cited by examiner

Current Block

| | |
|---|---|
| CB1 | (X1, Y1) |

Spatial Candidate

| | |
|---|---|
| SC11 | (X1+1, Y1+5) |
| SC21 | (X1-2, Y1+4) |
| SC31 | (X1+3, Y1+2) |
| SC41 | (X1-4, Y1+1) |
| SC51 | (X1, Y1+1) |
| SC61 | (X1-1, Y1) |

Temporal Candidate

| | |
|---|---|
| TC11 | (X1+1, Y1) |
| TC21 | (X1, Y1-1) |
| TC31 | (X1+4, Y1-1) |
| TC41 | (X1-3, Y1-2) |
| TC51 | (X1+2, Y1-4) |
| TC61 | (X1-1, Y1-5) |

| Current Block | |
|---|---|
| CB1 | (X1, Y1) |
| Spatial Candidate | |
| SC11 | (X1-3, Y1+6) |
| SC21 | (X1+4, Y1+5) |
| SC31 | (X1-1, Y1+4) |
| SC41 | (X1-5, Y1+3) |
| SC51 | (X1+2, Y1+2) |
| SC61 | (X1-3, Y1+1) |
| SC71 | (X1, Y1+1) |
| SC81 | (X1+5, Y1+1) |
| SC91 | (X1-1, Y1) |
| Temporal Candidate | |
| TC11 | (X1+1, Y1) |
| TC21 | (X1, Y1-1) |
| TC31 | (X1-5, Y1-2) |
| TC41 | (X1+4, Y1-2) |
| TC51 | (X1-2, Y1-4) |
| TC61 | (X1+2, Y1-5) |

| | |
|---|---|
| Current Block | |
| CB2 | (X2, Y2)=(X1+1, Y1) |
| Spatial Candidate | |
| SC12 | (X2+1, Y2+5) |
| SC22 | (X2−2, Y2+4) |
| SC32 | (X2+3, Y2+2) |
| SC42 | (X2−4, Y2+1) |
| SC52 | (X2, Y2+1) |
| SC62 | (X2−1, Y2) |
| Temporal Candidate | |
| TC12 | (X2+1, Y2) |
| TC22 | (X2, Y2−1) |
| TC32 | (X2+4, Y2−1) |
| TC42 | (X2−3, Y2−2) |
| TC52 | (X2+2, Y2−4) |
| TC62 | (X2−1, Y2−5) |

ELECTRONIC CIRCUIT AND ELECTRONIC DEVICE PERFORMING MOTION ESTIMATION THROUGH HIERARCHICAL SEARCH

CROSS-REFERENCE TO RELATED APPLICATION

This application claims priority under 35 U.S.C. § 119 to Korean Patent Application No. 10-2018-0164425 filed on Dec. 18, 2018, in the Korean Intellectual Property Office, the disclosure of which is incorporated herein by reference in its entirety.

BACKGROUND

Technical Field

The present disclosure relates to an electronic circuit and/or an electronic device. For example, at least some example embodiments relate to a circuit and/or a device for motion estimation of image or video processing.

Description of Related Art

Nowadays, various types of electronic devices are being used. An electronic device performs its own functions depending on operations of electronic components (e.g., devices and circuits) included in the electronic device.

Most of electronic devices which are being used nowadays include components which are capable of generating and outputting information of an image and/or a video. For example, a camera device may capture an object to generate data of a still image and/or a moving image, and a display device may output image information visually recognized based on data.

Meanwhile, as a demand for more vivid image and video increases, an amount of data for displaying an image and a video is gradually increasing, and various techniques for processing an image and a video are being developed. However, when a large amount of data is to be processed, a long time may be taken to read data from a memory and to process the read data. In this case, a speed of data processing may be degraded, and a large amount of power may be consumed to process data.

SUMMARY

Example embodiments of the present disclosure may decrease a time taken for motion estimation which is based on a hierarchical search, without degradation of accuracy of the motion estimation or with minimized degradation of accuracy of the motion estimation. In at least some example embodiments, the motion estimation may be performed based on candidate motion vectors which candidate blocks have, through a hierarchical search which does not accompany a full search.

In some example embodiments, an electronic circuit may be configured to perform motion estimation between images, the electronic circuit including processing circuitry configured to, determine a current block with regard to each of decimated images, the decimated images being generated from an original image such that the decimated images have resolutions that are different, the decimated images including a first decimated image having a first resolution which is a lowest resolution among the resolutions and a second decimated image having a second resolution which is a highest resolution amongst the resolutions, determine candidate blocks with regard to the decimated images based on a location of the current block such that the processing circuitry determines first candidate blocks of the candidate blocks without a full search for all pixels with regard to the first decimated image and determines second candidate blocks with regard to the original image, select some of the candidate blocks such that the processing circuitry selects some of the second candidate blocks with regard to the second decimated image, and generate a motion vector for the current block based on one reference patch, the one reference patch being determined from reference patches which are indicated by candidate motion vectors of the second candidate blocks.

In some example embodiments, an electronic device includes a memory configured to store first data of images of different resolutions including a first image of a first resolution and a second image of a second resolution, the first resolution being a lowest resolution among resolutions, the second resolution being a highest resolution among the resolutions; and a first electronic circuit configured to, determine, with regard to the first image, candidate blocks based on a location of a current block on the images without a full search for all pixels, select some of the candidate blocks based on the current block and reference patches with regard to each of the images according to order from the first image to the second image, the reference patches being indicated by candidate motion vectors of the candidate blocks, and generate a motion vector for the current block based on a reference patch indicated by a candidate motion vector of one candidate block which is selected with regard to the second image.

In some example embodiments, an electronic device includes one or more processors; and a memory configured to store instructions executable by the one or more processors, the instructions, when executed by the one or more processors, cause the one or more processors to, determine candidate blocks based on a location of a current block without a full search for all pixels with regard to a first decimated image among decimated images, the decimated images being generated from an original image such that the decimated images have resolutions lower than a first resolution of the original image, a second resolution of the first decimated image being a lowest resolution among the resolutions of the decimated images, and decrease a number of the candidate blocks by selecting some of the candidate blocks based on the current block and the candidate blocks with regard to each of the decimated images.

In some example embodiments, an electronic device includes one or more processors; and a memory configured to store instructions executable by the one or more processors, the instructions, when executed by the one or more processors, cause the one or more processors to, determine candidate blocks based on a location of a current block without a full search for all pixels with regard to a first decimated image among decimated images, the decimated images being generated from an original image such that the decimated images have resolutions lower than a first resolution of the original image, a second resolution of the first decimated image being a lowest resolution among the resolutions of the decimated images, and decrease a number of the candidate blocks by selecting some of the candidate blocks based on the current block and the candidate blocks with regard to each of the decimated images.

According to example embodiments, as an amount of data referenced for hierarchical-search-based motion estimation decreases, a speed of the motion estimation may be improved and power consumption may be reduced.

BRIEF DESCRIPTION OF THE DRAWINGS

The above and other objects and features of the present disclosure will become apparent by describing in detail example embodiments thereof with reference to the accompanying drawings.

DETAILED DESCRIPTION

Below, some example embodiments will be described in detail and clearly with reference to the accompanying drawings such that those skilled in the art easily can implement the present disclosure.

Figure 1:
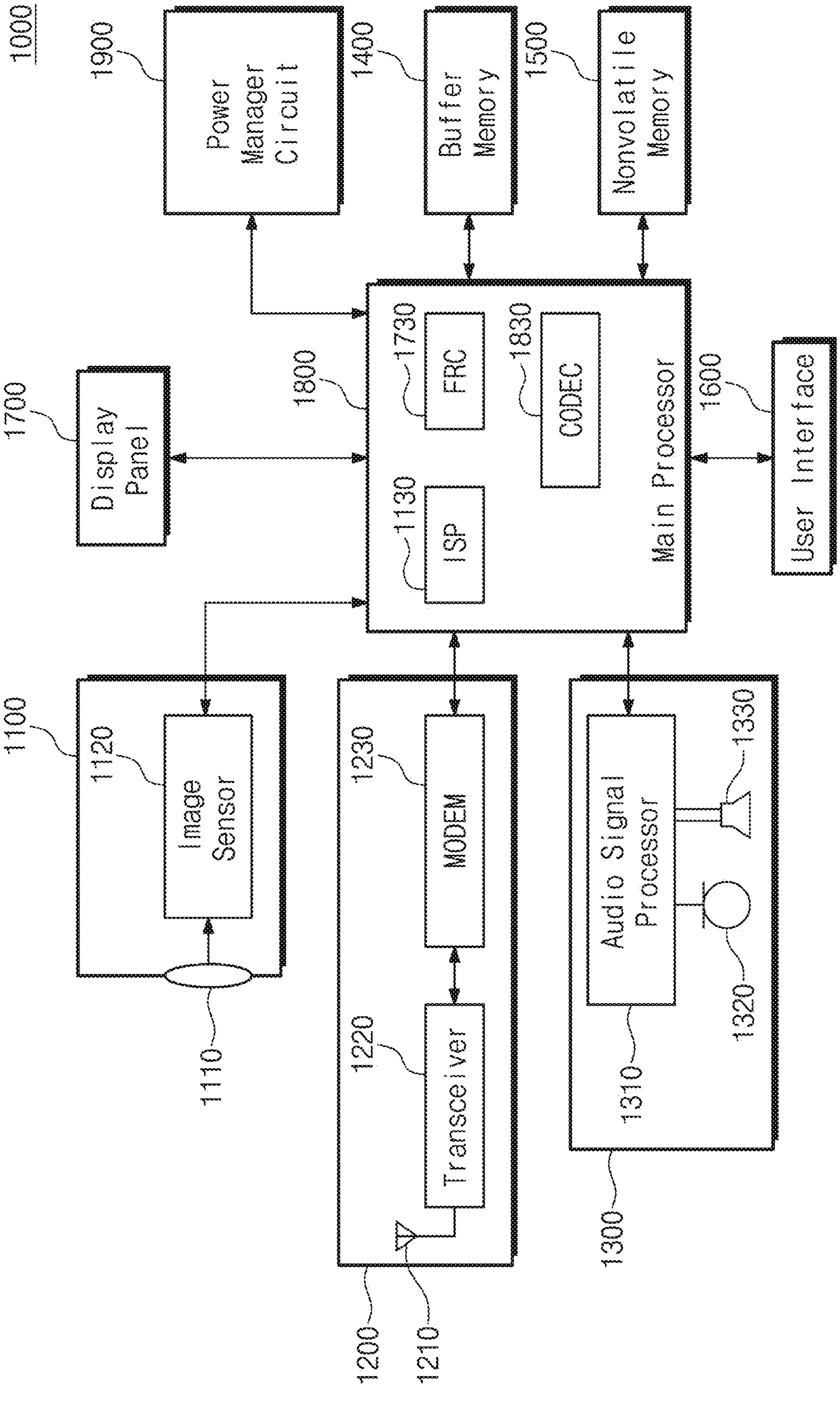
FIG. 1 is a block diagram illustrating an example configuration of an electronic device which may include an electronic circuit according to some example embodiments.

FIG. 1 is a block diagram illustrating an example configuration of an electronic device 1000 which may include an electronic circuit according to some example embodiments.

For example, the electronic device 1000 may be implemented in one of various types of electronic devices such as a desktop computer, a tablet computer, a laptop computer, a smart phone, a wearable device, a digital camera, a display device, a workstation, a server, an electric vehicle, a home appliance, a medical device, and/or the like.

The electronic device 1000 may include various electronic circuits and devices. For example, the electronic device 1000 may include an image processing block 1100, a communication block 1200, an audio processing block 1300, a buffer memory 1400, a nonvolatile memory 1500, a user interface 1600, a display panel 1700, a main processor 1800, and a power manager circuit 1900.

The image processing block 1100 may receive light through a lens 1110. An image sensor 1120 of the image processing block 1100 may generate an image signal associated with an external object, based on the received light. The image signal may describe a still image and/or a moving image for the external object. For example, the still image may provide a picture, and the moving image may provide a video.

The communication block 1200 may exchange signals with an external device/system through an antenna 1210. A transceiver 1220 and a modulator/demodulator (MODEM) 1230 of the communication block 1200 may process signals exchanged with the external device/system, in compliance with one or more of various wired/wireless communication protocols.

The audio processing block 1300 may process sound information by using an audio signal processor 1310. The audio processing block 1300 may receive an audio input through a microphone 1320 and/or may output an audio through a speaker 1330.

The buffer memory 1400 may store data used for an operation of the electronic device 1000. For example, the buffer memory 1400 may temporarily store data processed or to be processed by the main processor 1800. For example, the buffer memory 1400 may include a volatile memory (such as a static random access memory (SRAM), a dynamic RAM (DRAM), a synchronous DRAM (SDRAM), and/or the like) and/or a nonvolatile memory (such as a phase-change RAM (PRAM), a magneto-resistive RAM (MRAM), a resistive RAM (ReRAM), a ferroelectric RAM (FRAM), and/or the like).

The nonvolatile memory 1500 may store data irrespective of whether power is supplied. For example, the nonvolatile memory 1500 may include at least one of various nonvolatile memories such as a flash memory, a PRAM, an MRAM, a ReRAM, a FRAM, and/or the like. For example, the nonvolatile memory 1500 may include a removable memory such as a secure digital (SD) card or a solid state drive (SSD), and/or an embedded memory such as an embedded multimedia card (eMMC).

The user interface 1600 may arbitrate in communication between a user and the electronic device 1000. For example, the user interface 1600 may include an input interface for receiving an input from the user and an output interface for providing information to the user.

The display panel 1700 may provide visual information to the user. For example, the display panel 1700 may display a still image and/or a moving image based on image data. For example, the display panel 1700 may be implemented in a liquid crystal display (LCD), a light emitting diode (LED)

display, an organic LED (OLED) display, an active matrix OLED (AMOLED) display, and/or the like.

The main processor 1800 may control overall operations of components of the electronic device 1000. The main processor 1800 may process various operations to operate the electronic device 1000. For example, the main processor 1800 may be implemented in a general-purpose processor, a special-purpose processor, an application processor, a microprocessor, and/or the like, and may include one or more processor cores.

For example, the buffer memory 1400 and/or the non-volatile memory 1500 may store instructions which are executable by one or more processors (e.g., the main processor 1800). The instructions may be provided based on a program code of software and/or firmware. For example, when the instructions are executed by the main processor 1800, the instructions may transform the main processor 1800 into a special purpose processor configured to perform operations described in the present disclosure.

In some example embodiments, the main processor 1800 may include an image signal processor (ISP) 1130, a frame rate converter (FRC) 1730, and an encoder/decoder (CODEC) 1830. For example, as discussed above, the instructions may transform the main processor 1800 into a special purpose processor to perform the operations of the ISP 1130, the FRC 1730, and the CODEC 1830.

The ISP 1130 may perform various signal processing on an image signal which is generated by the image sensor 1120. For example, the ISP 1130 may perform image signal processing, such as demosaicing, digital image stabilization, noise reduction, edge enhancement, and/or the like, to output image data which suitably describes an external object. For example, the image data may be stored in the buffer memory 1400 and/or the nonvolatile memory 1500, and visual information based on the image data may be displayed on the display panel 1700.

The CODEC 1830 may encode and/or decode the image data. For example, the CODEC 1830 may perform encoding to reduce an amount of image data generated by the ISP 1130 (e.g., to compress the image data). For example, the CODEC 1830 may decode the encoded image data, and visual information based on the decoded image data may be output on the display panel 1700.

The FRC 1730 may adjust a frame rate associated with a frequency of the image data. For example, the FRC 1730 may operate between the ISP 1130 and the CODEC 1830, and/or may operate between the CODEC 1830 and the display panel 1700. For example, the FRC 1730 may convert a frame rate of the image data generated by the ISP 1130 to be suitable for a format of the image data.

For example, when the display panel 1700 displays visual information based on the image data decoded by the CODEC 1830, the FRC 1730 may convert a frame rate of the image data to be suitable for an operation characteristic of the display panel 1700. For example, when a frame rate of the image data describing the video information is lower than a frame rate of the display panel 1700, the FRC 1730 may insert an intermediate frame between video frames to increase a frame rate.

FIG. 1 illustrates that the ISP 1130, the FRC 1730, and the CODEC 1830 are included in the main processor 1800. However, FIG. 1 is provided to facilitate better understanding, and is not intended to limit the present disclosure. In some example embodiments, the main processor 1800 may include an application processor, and the application processor, the ISP 1130, the FRC 1730, and the CODEC 1830 may be implemented in one system-on-chip (SoC).

Alternatively, at least one of the ISP 1130, the FRC 1730, and/or the CODEC 1830 may be provided outside the main processor 1800. For example, the ISP 1130 may be implemented in one chip together with the image sensor 1120 in the image processing block 1100, and the FRC 1730 may be implemented within one display device together with the display panel 1700. Alternatively, at least one of the ISP 1130, the FRC 1730, and/or the CODEC 1830 may be implemented in an independent intellectual property (IP) which is separate from other components.

The ISP 1130, the FRC 1730, and the CODEC 1830 may be implemented in hardware circuits (e.g., analog circuits, logic circuits, and/or the like) configured to perform operations described in the present disclosure. Alternatively, the ISP 1130, the FRC 1730, and the CODEC 1830 may be implemented in a program code of software and/or firmware, and one or more processors (e.g., the main processor 1800) may execute instructions of the program code to provide operations of the ISP 1130, the FRC 1730, and the CODEC 1830. In some cases, each of the ISP 1130, the FRC 1730, and the CODEC 1830 may be implemented in a form of combination (or hybrid) of hardware and software.

In some example embodiments, each of the ISP 1130, the FRC 1730, and the CODEC 1830 may accompany motion estimation. The motion estimation performed in the electronic device 1000 will be described with reference to FIGS. 2 to 17.

The power manager circuit 1900 may supply power which is used to operate the electronic device 1000. The power management circuit 1900 may generate power which is suitable to operate components of the electronic device 1000, by suitably converting power provided from a battery and/or an external power source.

Figure 2:
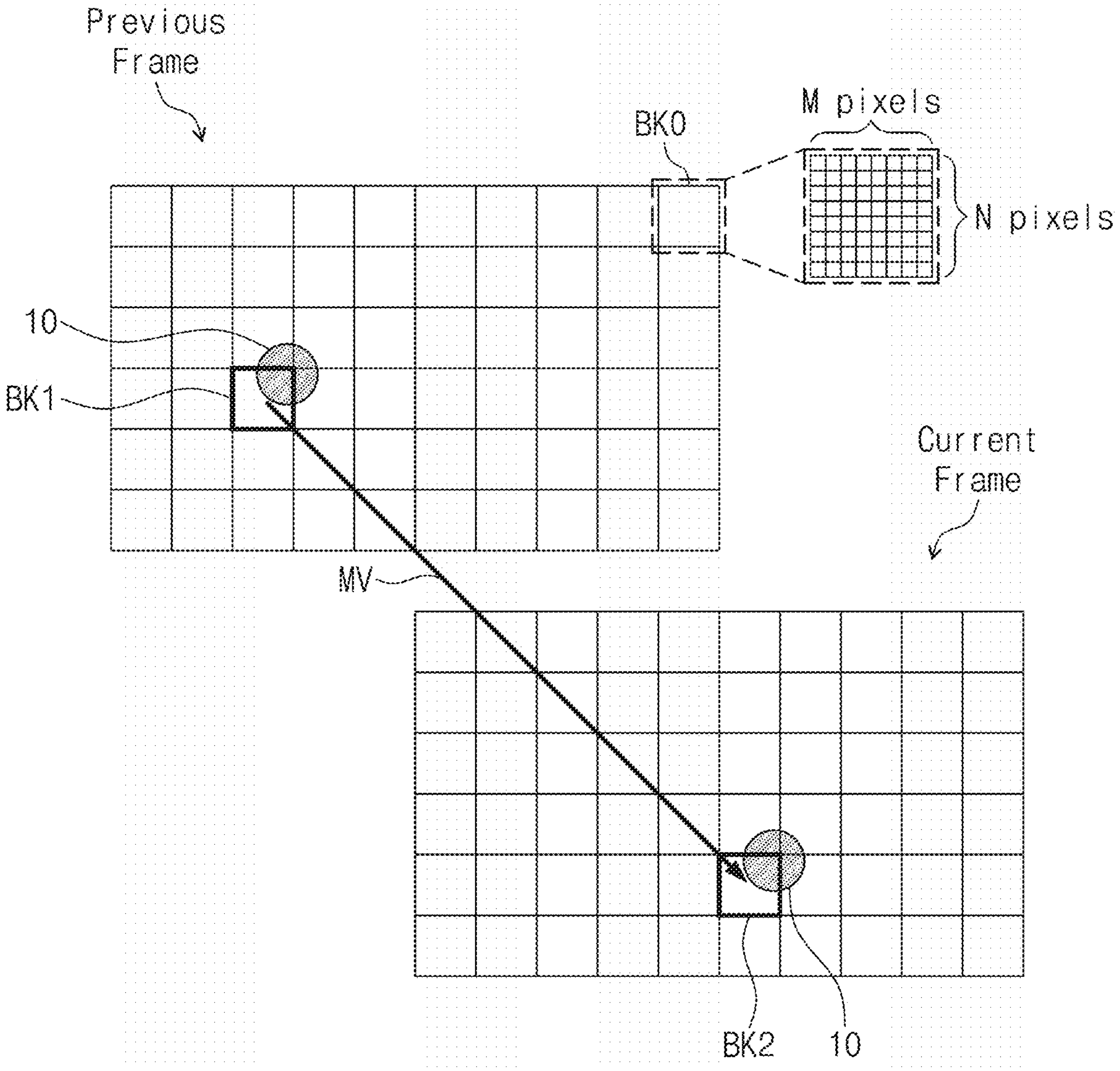
FIG. 2 is a conceptual diagram for describing motion estimation performed in an electronic device of FIG. 1.
Figure 3A:
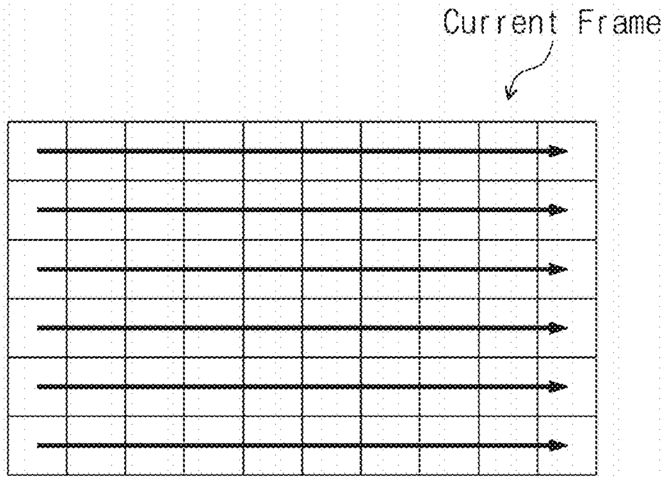
FIGS. 3A to 3C are conceptual diagrams for describing recursions for blocks constituting an image with regard to motion estimation.
Figure 3B:
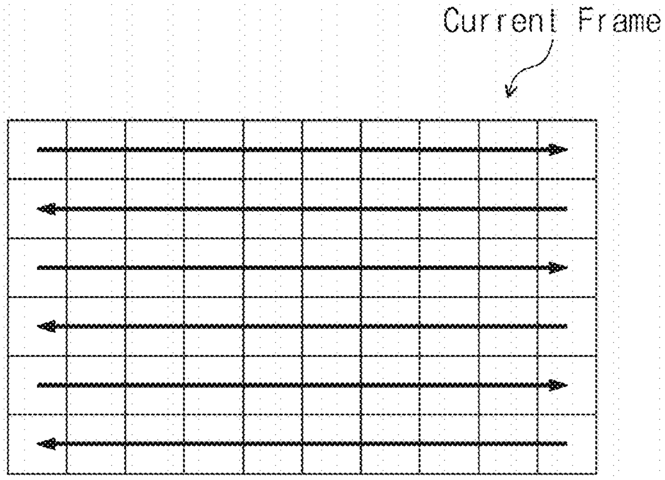
Figure 3C:
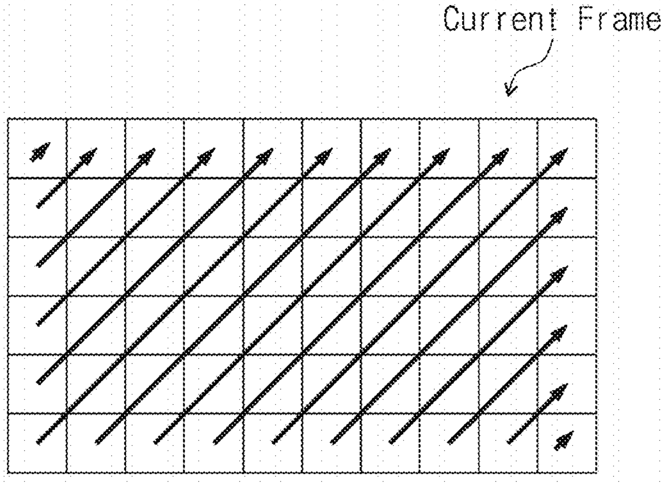

FIG. 2 is a conceptual diagram for describing motion estimation performed in the electronic device 1000 of FIG. 1. FIGS. 3A to 3C are conceptual diagrams for describing recursions for blocks constituting an image with regard to motion estimation.

Referring to FIG. 2, the motion estimation may be performed to estimate a motion of an object between images. For example, the motion estimation may be performed between an image provided as a current frame and an image provided as a previous frame. For the motion estimation, the buffer memory 1400 and/or the nonvolatile memory 1500 may store data of the image of the current frame and data of the image of the previous frame.

For example, to perform the motion estimation, an image of each frame may be divided into blocks (e.g., macroblocks). In this regard, it may be understood that the divided blocks constitute the image. Each block may be arranged to correspond to a location indicated by a coordinate on the image.

One block may be divided to include a plurality of pixels constituting the image. For example, a block BK0 may be divided such that M×N pixels constitute the block BK0 (M and N being a positive integer). A size of each block may be variously changed or modified to be suitable for the motion estimation.

For example, it may be intended to estimate a motion of an object 10 in the motion estimation. With regard to the current frame, the object 10 may be displayed at a location which corresponds to a block BK2. On the other hand, with regard to the previous frame, the object 10 may be displayed at a location which corresponds to a block BK1. In this case, the motion estimation may obtain a motion vector MV from the block BK1 with regard to the motion of the object 10.

A motion vector may be an element indicating a change of a location of a block between the image of the current frame and the image of the previous frame. For example, the motion vector MV of FIG. 2 may be applied to the block BK2 of the current frame, and may be associated with the motion of the object 10 or a location change between the block BK1 and the block BK2.

The motion estimation may be performed to generate motion vectors for all blocks constituting the image of the current frame. An operation of generating a motion vector may be recursively performed on the blocks constituting the image. The recursions may be performed according to an order following blocks.

For example, referring to FIGS. 3A and 3B, an operation of generating a motion vector may be recursively performed on blocks constituting one row, and then may be recursively continued on blocks constituting another row. Referring to FIG. 3A, an operation of generating a motion vector may progress in the same direction at adjacent rows. Alternatively, referring to FIG. 3B, an operation of generating a motion vector may progress in opposite directions at adjacent rows. Alternatively, referring to FIG. 3C, an operation of generating a motion vector may be recursively performed along blocks of a diagonal direction.

However, the orders of FIGS. 3A to 3C are provided to facilitate better understanding, and the present disclosure is not limited to the orders of FIGS. 3A to 3C. An order of blocks associated with an operation of generating a motion vector may be variously changed or modified to be suitable for the motion estimation. However, to facilitate better understanding in the following descriptions, it will be assumed that the motion estimation is based on the order illustrated in FIG. 3A.

The motion estimation may be employed in the ISP 1130, the FRC 1730, and the CODEC 1830. For example, with regard to digital signal stabilization or temporal noise reduction, the ISP 1130 may employ the motion estimation to distinguish an intended image component from an unintended noise component. For example, the FRC 1730 may employ the motion estimation to generate an intermediate frame where a motion of an object is suitably applied between a previous frame and a next frame. For example, the CODEC 1830 may employ the motion estimation to compress image data based on a location change of a block. Besides, the motion estimation may be variously employed for image processing and video processing.

Accordingly, performing the motion estimation accurately and efficiently may be helpful to improve quality of image processing and video processing. In this regard, true motion estimation for estimating a motion which is close to a motion perceivable by a person may be more advantageous to improve quality of image processing and video processing, and may make user satisfaction high. Example embodiments to be described below may facilitate accurate and efficient true motion estimation.

Figure 4:
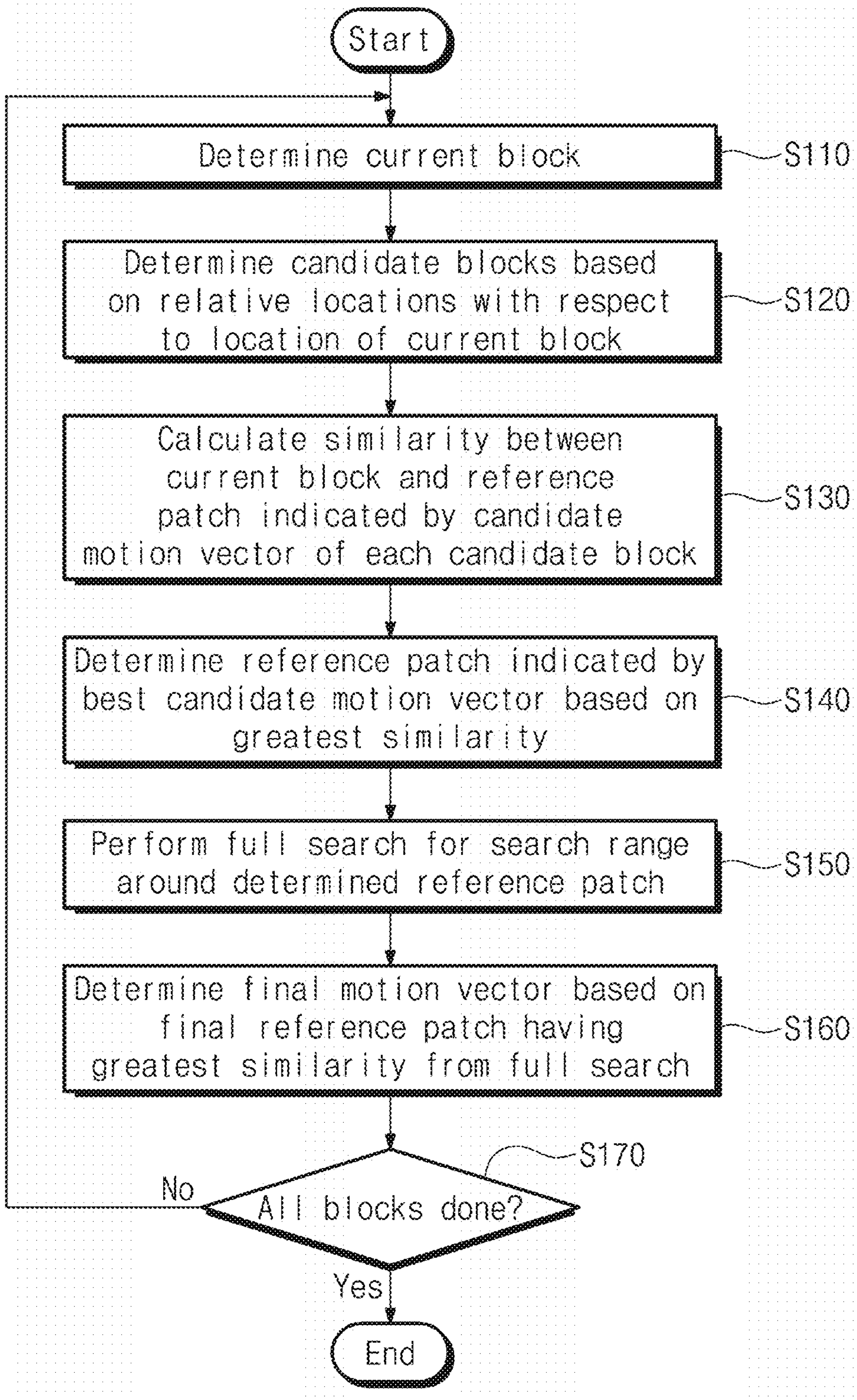
FIG. 4 is a flowchart describing example operations for performing motion estimation.
Figure 5A:
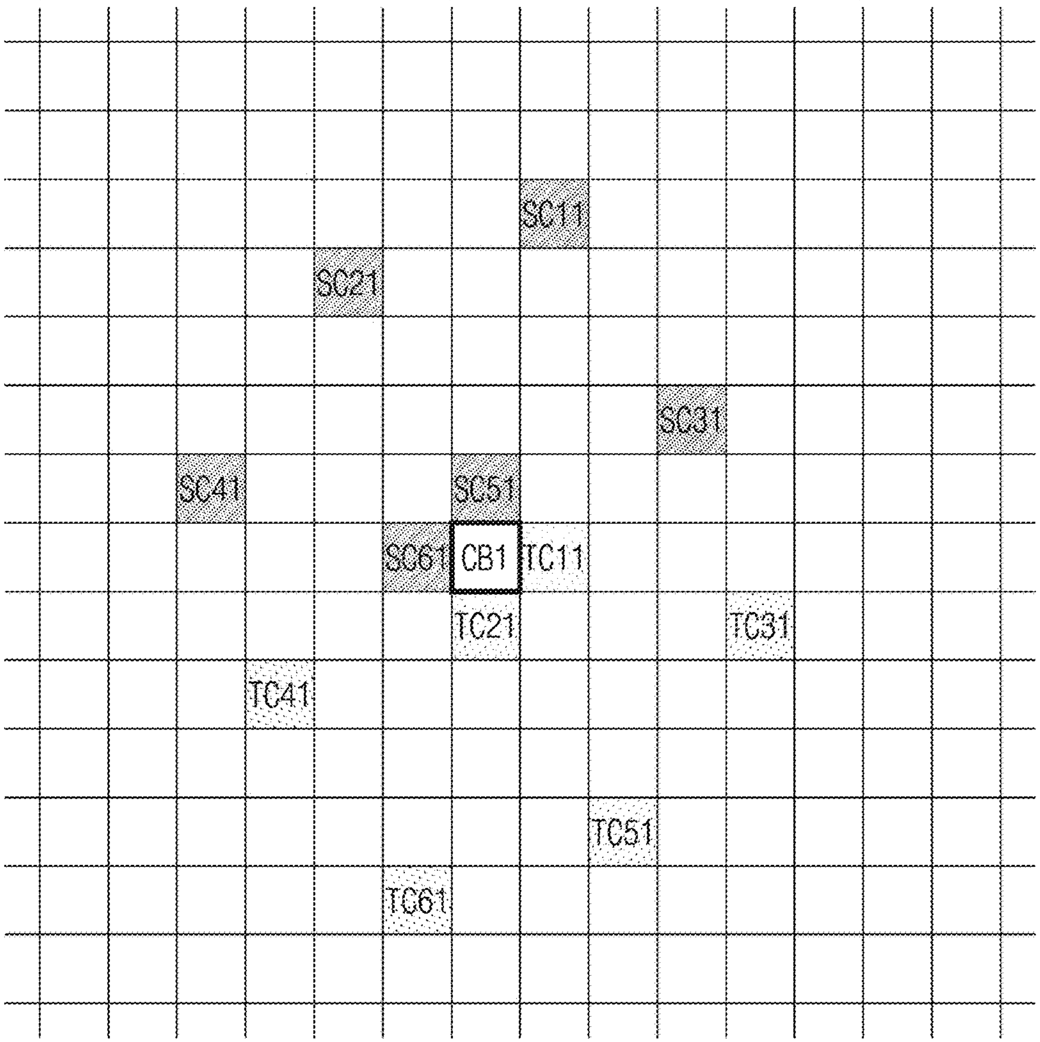
FIGS. 5A and 5B are conceptual diagrams illustrating examples of a current block and candidate blocks referenced in motion estimation.
Figure 5B:
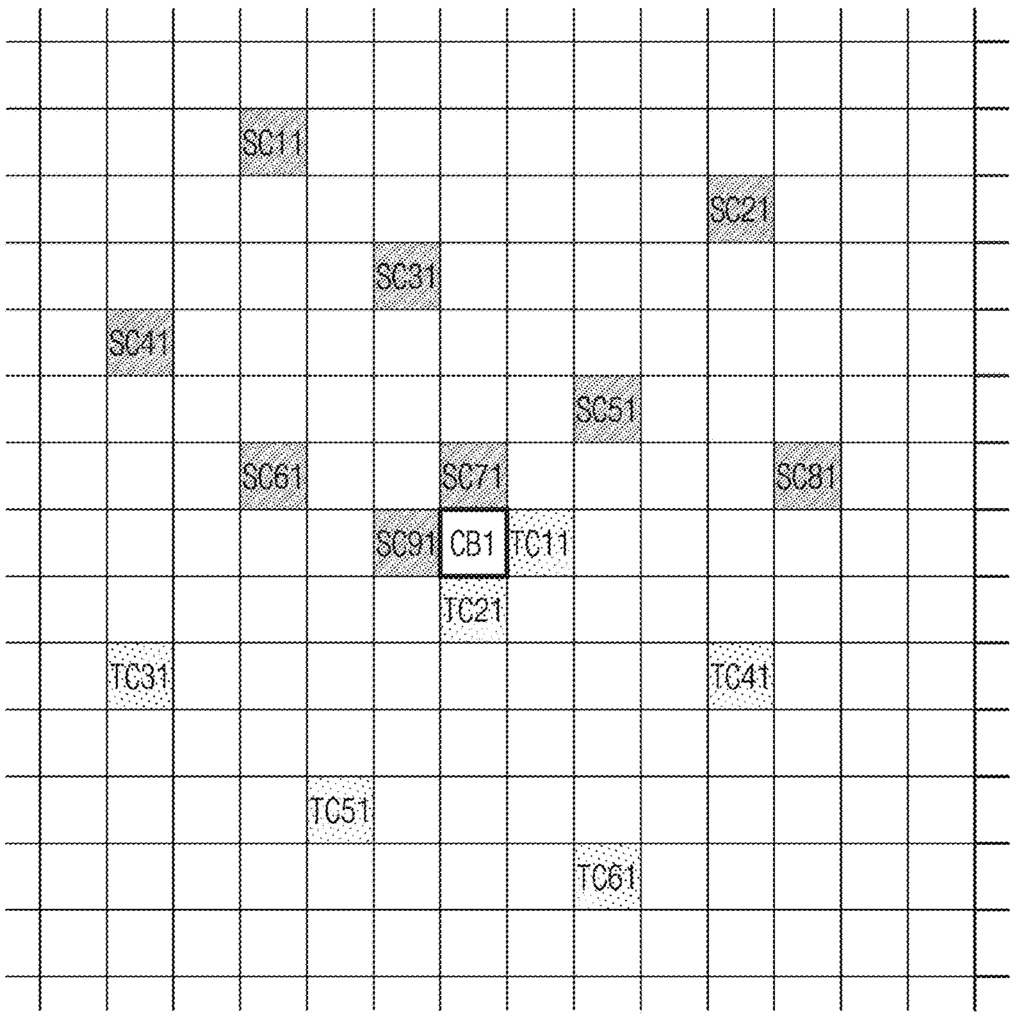
Figure 6:
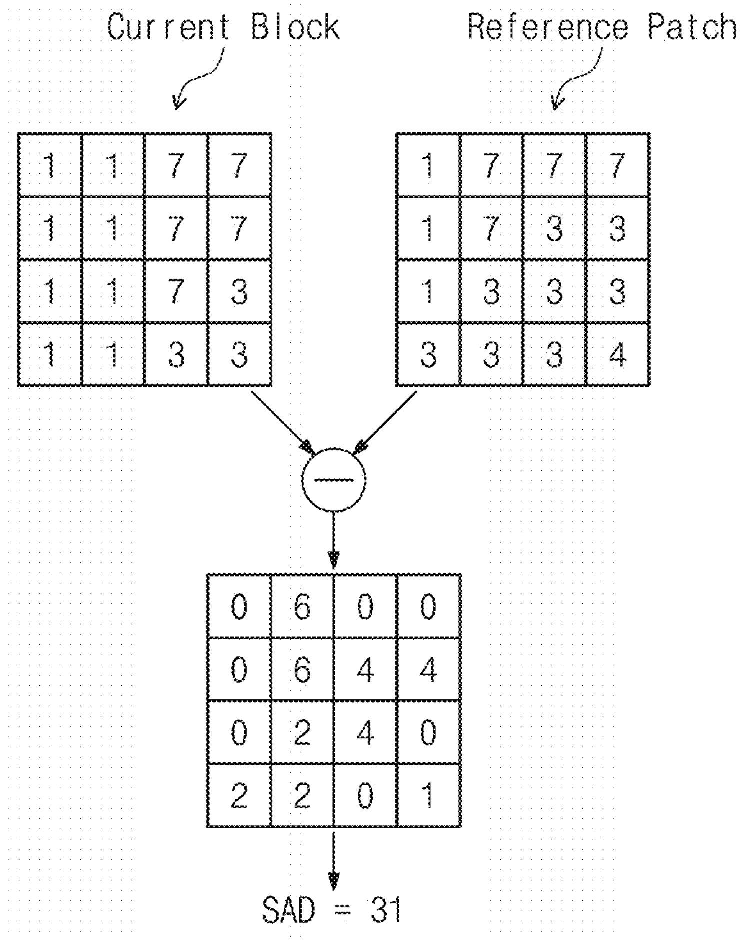
FIG. 6 is a conceptual diagram for describing a similarity between a current block and a reference patch.

FIG. 4 is a flowchart describing example operations for performing motion estimation. FIGS. 5A and 5B are conceptual diagrams illustrating examples of a current block and candidate blocks referenced in motion estimation. FIG. 6 is a conceptual diagram for describing a similarity between a current block and a reference patch. FIG. 7 and FIGS. 8A to 8C are conceptual diagrams for describing a full search for motion estimation. FIG. 9 is a conceptual diagram for describing following motion estimation for a next current block.

The motion estimation described in the present disclosure may be performed by the ISP 1130, the FRC 1730, the CODEC 1830, and/or another component. For example, a component employing the motion estimation may include an electronic circuit (refer to FIG. 10) for performing the motion estimation, and the electronic circuit may perform operations described in the present disclosure. Additionally or alternatively, as an instruction is executed by one or more processors, the instruction may cause the one or more processors (e.g., the main processor 1800) to perform operations described in the present disclosure. Hereinafter processing circuitry may refer to either the electronic circuit or the main processor 1800, and may include hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

Referring to FIG. 4, in operation S110, the processing circuitry may determine a current block. The current block may mean a block, where an operation of generating a motion vector is to be performed in a current recursion, among blocks constituting an image provided as a current frame. A current location may correspond to a current location (e.g., coordinate) on the image. As described with reference to FIGS. 3A to 3C, a current block and a current location may be determined according to an order following blocks.

In operation S120, the processing circuitry may determine candidate blocks. The candidate blocks may mean blocks having candidate motion vectors to be referenced to obtain a motion vector for the current block. A candidate motion vector, which indicates a reference patch the most similar to the current block, among the candidate motion vectors may be expected as being suitable to obtain the motion vector for the current block. A patch or a reference patch may mean a unit area having the same size as a size of a block at a location on the image of the current frame.

The candidate blocks may correspond to relative locations with respect to the current location of the current block on the image. When the current location of the current block is determined on the image, the candidate blocks may be determined on respective relative locations on the basis of the location of the current block.

For example, referring to FIG. 5A, a current block CB1 may correspond to a current location of (X1, Y1). Candidate blocks SC11 to SC61 and TC11 to TC61 may respectively correspond to relative locations with respect to the current location. For example, the candidate block SC11 may correspond to (X1+1, Y1+5) which is a relative location with respect to the location of (X1, Y1). Descriptions associated with locations of other candidate blocks will be omitted below for brevity.

However, the present disclosure is not limited to FIG. 5A, and relative locations of candidate blocks may be variously changed or modified. For example, referring to FIG. 5B, the current block CB1 may correspond to the current location of (X1, Y1), and candidate blocks SC11 to SC91 and TC11 to TC61 may respectively correspond to relative locations with respect to the current location.

From the following descriptions, it may be readily understood that example candidate blocks of FIGS. 5A and 5B are provided to facilitate better understanding. Attributes such as the number of candidate blocks, locations of the candidate blocks, and distribution of the candidate blocks may be designed taking into account various factors such as accuracy and performance of the motion estimation. However, to facilitate better understanding in the following descriptions, it will be assumed that the motion estimation is based on a coordinate relationship between the current location of the current block CB1 and the relative locations of the candidate blocks SC11 to SC61 and TC11 to TC61 illustrated in FIG. 5A.

Relative locations of candidate blocks may be variously changed or modified to perform the motion estimation accurately and suitably. For example, relative locations of candidate blocks may be set in advance by a designer of a component (e.g., the ISP 1130, the FRC 1730, the CODEC 1830, and/or the like) employing the motion estimation before the electronic device 1000 operates. Alternatively, relative locations of candidate blocks may be reprogrammed suitably during an operation of the electronic device 1000.

Meanwhile, when the motion estimation is based on the order illustrated in FIG. 3A, motion vectors for the candidate blocks SC11 to SC61 may have been already generated with regard to the current frame. On the other hand, motion vectors for the candidate blocks TC11 to TC61 may not be yet generated with regard to the current frame. However, with regard to a previous frame, motion vectors for the candidate blocks TC11 to TC61 may have been generated.

The motion estimation may read data of reference patches from the buffer memory 1400 and/or the nonvolatile memory 1500 to refer to the reference patches indicated by candidate motion vectors of the candidate blocks corresponding to the relative locations. The motion estimation may refer to reference patches indicated by candidate motion vectors of the candidate blocks SC11 to SC61 based on the data of the image of the current frame. In this regard, the candidate blocks SC11 to SC61 may be understood as spatial candidate blocks.

The motion estimation may refer to reference patches indicated by candidate motion vectors of the candidate blocks TC11 to TC61 based on data of an image of a previous frame. In this regard, the candidate blocks TC11 to TC61 may be understood as temporal candidate blocks.

Returning to FIG. 4, in operation S130, the processing circuitry may calculate a similarity between the current block and each of the reference patches indicated by the candidate motion vectors of the candidate blocks. It is likely that a candidate motion vector indicating a reference patch most similar to the current block is similar to a motion vector intended to be obtained with regard to the current block.

In operation S140, the processing circuitry may determine which reference patch is the most similar to the current block, based on the similarity calculation. That is, a similarity calculated with regard to the determined one reference patch may be the greatest similarity among similarities calculated with regard to all reference patches. In the present disclosure, a candidate motion vector indicating the determined one reference patch may be referred to as a best candidate motion vector.

The similarity between the current block and the reference patch may be calculated in various manners. For example, referring to FIG. 6, a similarity may be calculated based on a pixel value. The pixel value may mean a value (e.g., an RGB value, a brightness value, a transparency value, and/or the like) corresponding to a pixel constituting a block or a patch.

For example, the motion estimation may calculate differences between pixel values of the current block and pixel values of the reference patch. Then, the motion estimation may calculate a sum of the calculated differences. The calculated sum may be understood as a sum of absolute difference (SAD).

The similarity may be calculated based on the SAD. When the SAD calculated with regard to the reference patch is great, it may be understood that the similarity between the reference patch and the current block is small. On the other hand, when the SAD calculated with regard to the reference patch is small, it may be understood that the similarity between the reference patch and the current block is great. It may be understood that, among the reference patches, a reference patch which corresponds to the smallest SAD is the most similar to the current block.

In such a manner, the processing circuitry may determine one reference patch, which is the most similar to the current block, among reference patches. However, the similarity calculation described with reference to FIG. 6 is one of possible manners, and is not intended to limit the present disclosure. The similarity calculation may be variously changed or modified to be suitable for the motion estimation.

Returning to FIG. 4, in operation S150, the processing circuitry may perform a full search based on the determined one reference patch. For example, the determined one reference patch may be more similar to the current block than other reference patches, but may be somewhat different from the current block. Accordingly, the full search may provide fine tuning for searching for a patch which is more similar to the current block within a search range around the determined one reference patch.

In operation S160, the processing circuitry may determine a final reference patch within the search range through the full search. The final reference patch may mean a reference patch, which is determined as being the most similar to the current block, among patches included in the search range. In the present disclosure, a motion vector indicating the final reference patch may be referred to as a final motion vector.

Figure 7:
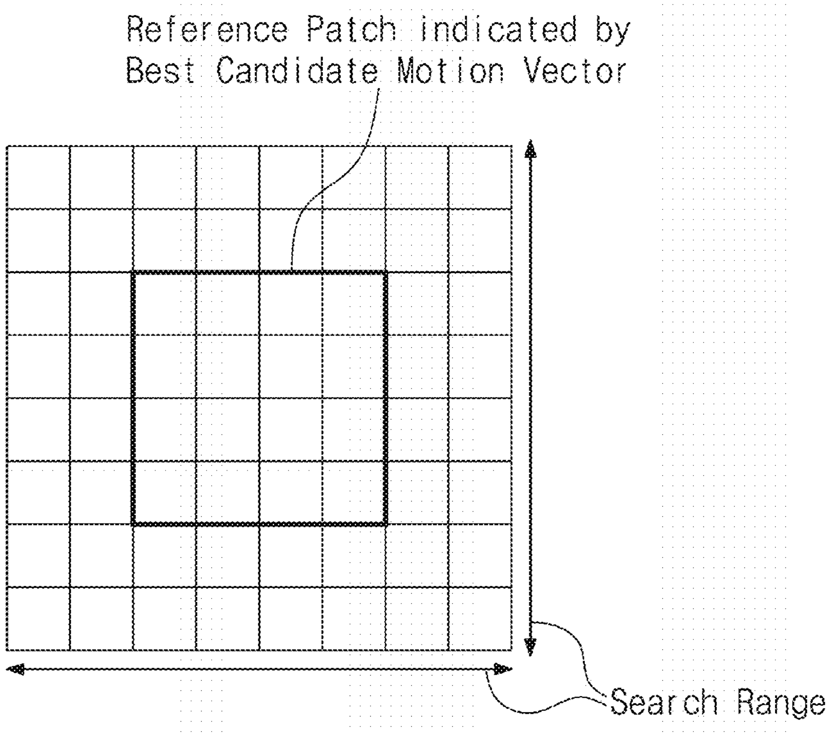
FIG. 7 and FIGS. 8A to 8C are conceptual diagrams for describing a full search for motion estimation.

Referring to FIG. 7, when a reference patch indicated by the best candidate motion vector is determined based on similarity calculation, the motion estimation may set the search range around the determined reference patch. The search range may mean a range where the full search is performed.

The search range may include pixels constituting the determined reference patch. In addition, the search range may further include pixels which are determined based on locations of pixels of the determined reference patch. For example, the search range may be set to further include several pixels along a horizontal direction and a vertical direction on the basis of the pixels of the determined reference patch. However, this is only one of possible examples, and is not intended to limit the present disclosure.

Afterwards, the motion estimation may combine pixels included in the search range to determine search patches. The motion estimation may determine the final reference patch based on a similarity between pixels constituting each search patch and pixels constituting the current block. The similarity may be calculated through the manner described with reference to FIG. 6 or another manner.

Figure 8A:
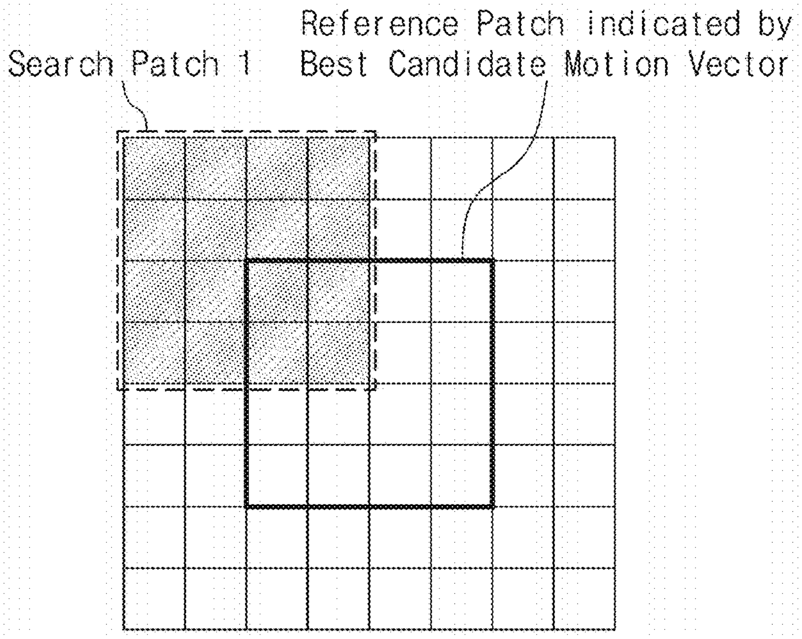
Figure 8B:
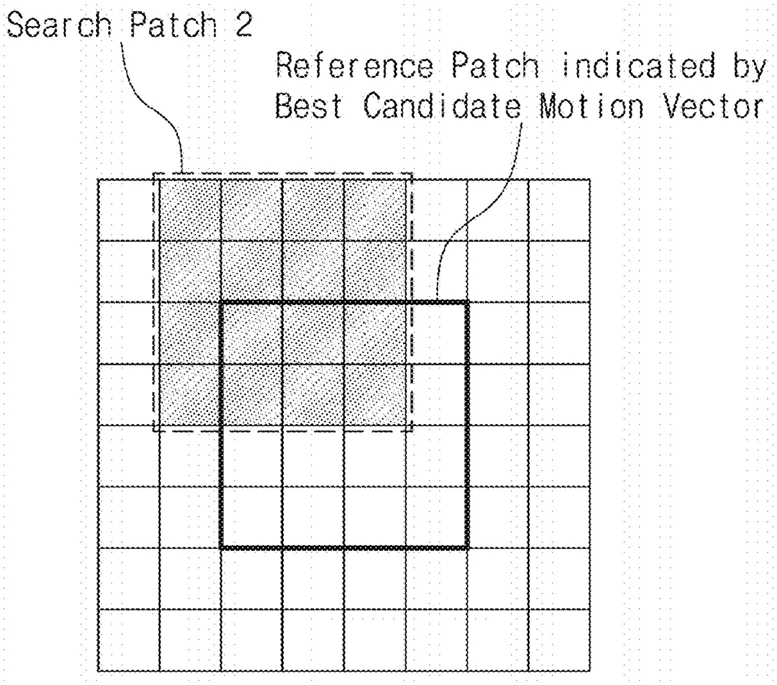
Figure 9:
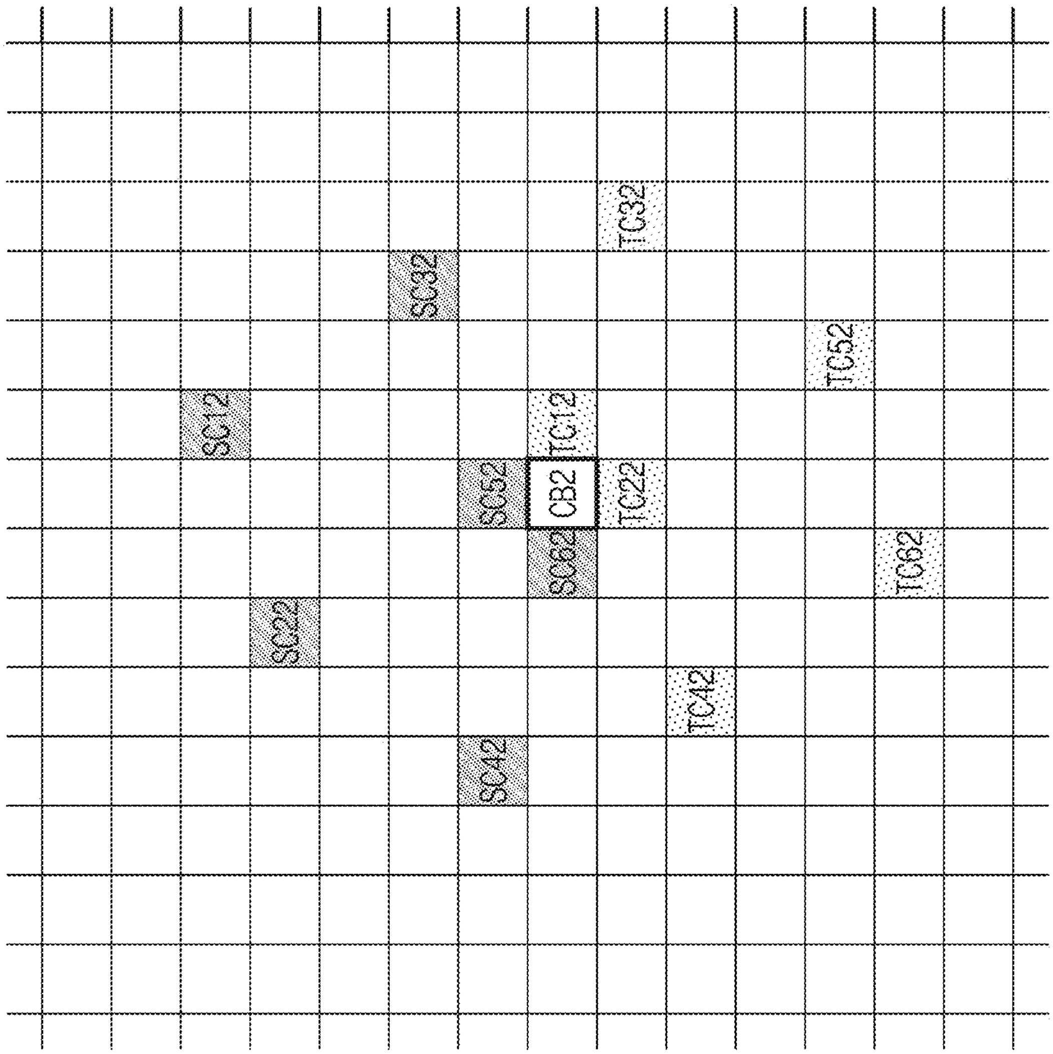
FIG. 9 is a conceptual diagram for describing following motion estimation for a next current block.

For example, referring to FIG. 8A, the motion estimation may determine a first search patch including pixels, the number of which is identical to the number of pixels constituting the current block, within the search range and may calculate a similarity between the current block and the first search patch. In addition, referring to FIG. 8B, in a similar manner, the motion estimation may determine a second search patch within the search range and may calculate a similarity between the current block and the second search patch.

Figure 8C:
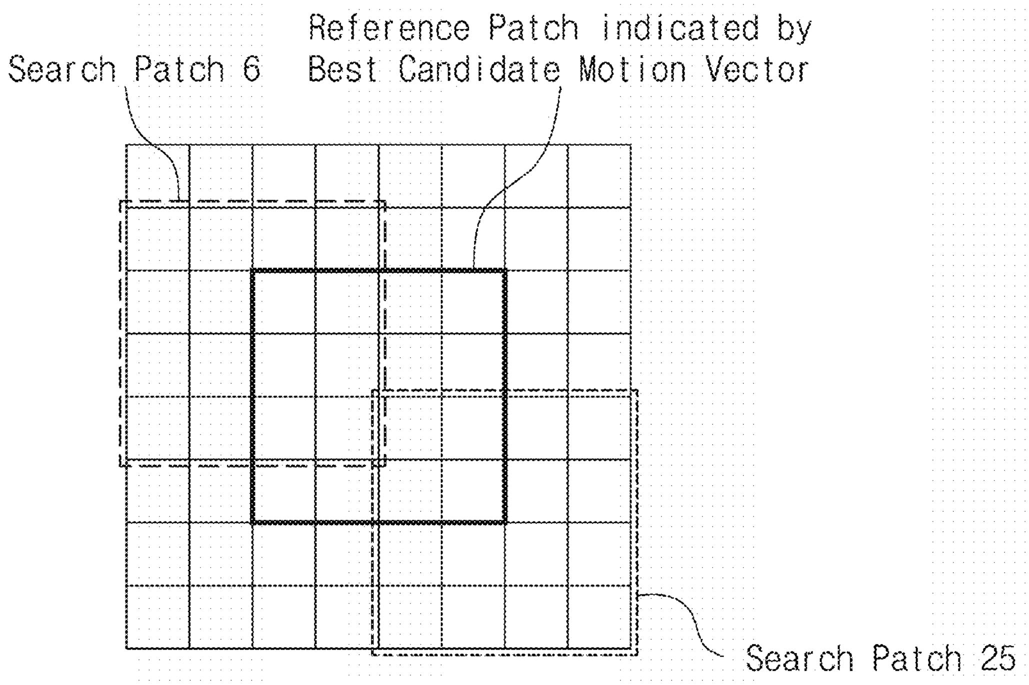

In such a manner, referring to FIG. 8C, the motion estimation may determine a plurality of search patches within the search range by combining pixels, the number of which is identical to the number of the pixels constituting the current block. For example, in a similar manner, the motion estimation may determine a sixth search patch and a twenty-fifth search patch. In addition, the motion estimation may calculate a similarity between the current block and each of the plurality of search patches.

The motion estimation may determine a search patch, which is the most similar to the current block, among the plurality of search patches as the final reference patch. Through the full search of FIGS. 7 to 8C, the motion estimation may determine the final reference patch which is the most similar to the current block. For example, it is likely that the final motion vector indicating the final reference patch is similar to a motion vector that the motion estimation intends to obtain from the current block. Accordingly, the final motion vector may be the most suitable to obtain the motion vector for the current block.

Through operation S110 to operation S160, the motion estimation may obtain the motion vector for the current block based on the final candidate motion vector among the candidate motion vectors which the candidate blocks have. For example, the motion vector for the current block may be generated based on the final motion vector indicating the final reference patch within the search range. The generated motion vector may describe a location change of the current block or a motion of an object associated with the current block.

Meanwhile, when motion vectors are not generated with regard to all the blocks constituting the image of the current frame (No of operation S170 of FIG. 4), the processing circuitry may perform operation S110 to operation S160 on a block where the motion vector is not generated. To this end, the processing circuitry may newly determine a current block such that a current location on the image of the current frame moves to correspond to a block where the motion vector is not generated.

For example, when a motion vector for the current block CB1 of FIG. 5A is generated, the motion estimation may newly determine a current block CB2 of FIG. 9. Referring to FIG. 9, for example, the current block CB2 may be determined such that a current location of (X2, Y2) corresponding to the current block CB2 moves from the location (X1, Y1) of FIG. 5A (e.g., when the order of FIG. 3A is employed, (X2, Y2)=(X1+1, Y1)). Operation S110 to operation S160 may be performed to generate a motion vector for the current block CB2.

To generate the motion vector for the current block CB2, the processing circuitry may determine candidate blocks SC12 to SC62 and TC12 to TC62. The candidate blocks SC12 to SC62 and TC12 to TC62 may correspond to relative locations with respect to the current location (X2, Y2) of the current block CB2.

The motion estimation may determine candidate blocks such that a coordinate relationship between the moved current location and the relative locations corresponding to the candidate blocks does not change. For example, comparing FIG. 5A with FIG. 9, a coordinate relationship between the current location of the current block CB2 and relative locations of the candidate blocks SC12 to SC62 and TC12 to TC62 in FIG. 9 may be identical to the coordinate relationship between the current location of the current block CB1 and the relative locations of the candidate blocks SC11 to SC61 and TC11 to TC61 in FIG. 5A. That is, the motion estimation may determine candidate blocks without changing relative locations which are set in advance or reprogrammed.

The operations described with reference to FIGS. 4 to 9 may be recursively performed on blocks constituting an image of a current frame. That is, for each recursion for the blocks constituting the image, the motion estimation may determine a current block and candidate blocks, may determine a final reference patch based on similarities with regard to reference patches indicated by motion vectors that the candidate blocks have, and may generate a motion vector for the current block from a final motion vector indicating the final reference patch. For each recursion for the blocks constituting the image, relative locations with respect to the current location may not change.

After motion vectors for all blocks constituting the image of the current frame are generated (Yes of S170 of FIG. 4), recursions for the blocks constituting the image may be completed. The image where the motion estimation is completed may be referenced by the ISP 1130, the FRC 1730, the CODEC 1830, and/or another component. Afterwards, for example, with regard to a next frame following the current frame, the operations described with reference to FIGS. 4 to 9 may be performed.

The motion estimation described with reference to FIGS. 4 to 9 may be performed with reference to a candidate block where a motion vector has been already generated. Such motion estimation may use data of an image of a previous frame in addition to data of an image of a current frame. In this regard, such motion estimation may be understood as employing a 3-dimensional recursive search (3DRS) manner.

Figure 10:
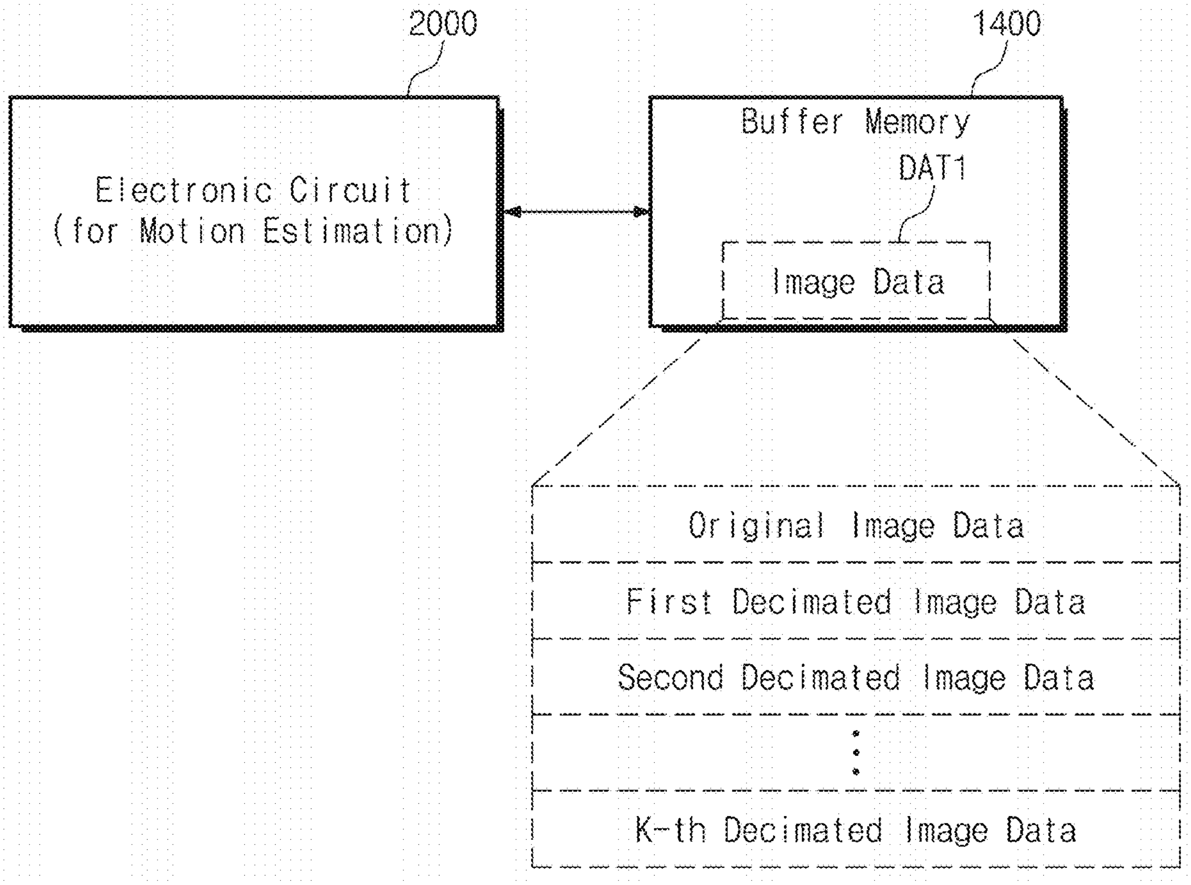
FIG. 10 is a block diagram illustrating an example configuration for performing motion estimation according to some example embodiments.

FIG. 10 is a block diagram illustrating an example configuration for performing motion estimation according to some example embodiments.

In some example embodiments, an electronic circuit 2000 for performing the motion estimation between images may be provided. The motion estimation described in the present disclosure may be performed by the electronic circuit 2000.

For example, the electronic circuit 2000 may be included in the ISP 1130, the FRC 1730, the CODEC 1830, and/or another component. Alternatively, the electronic circuit 2000 may be implemented in an independent IP. The electronic circuit 2000 may be shared by the ISP 1130, the FRC 1730, the CODEC 1830, and/or another component, or may be separately provided for the ISP 1130, the FRC 1730, the CODEC 1830, and/or another component.

The electronic circuit 2000 may include hardware circuits (e.g., hardware circuits, logic circuits, and/or the like) configured to perform the motion estimation described in the present disclosure. In some example embodiments, the electronic circuit 2000 may be implemented in an application specific integrated circuit (ASIC) or a field programmable gate array (FPGA).

Additionally or alternatively, the electronic circuit 2000 may be a portion of one or more processors (e.g., the main processor 1800), and may execute instructions of a program code configured to provide the motion estimation described in the present disclosure. In some cases, the buffer memory 1400 and/or the nonvolatile memory 1500 may store instructions, and the electronic circuit 2000 may communicate with the buffer memory 1400 and/or the nonvolatile memory 1500 to execute the instructions.

For example, the buffer memory 1400 may store image data DAT1. The image data DAT1 may include, at least, data of an image of a current frame and data of an image of a previous frame. For example, the image data DAT1 may include information of pixel values. While performing the motion estimation, the electronic circuit 2000 may communicate with the buffer memory 1400 to read the image data DAT1.

In example embodiments, the motion estimation may be performed based on a hierarchical search. To this end, the image data DAT1 may include data of an original image and data of K decimated images (K being a natural number). Such decimation may be identically applied to both a current image and a previous image. The decimated image and the hierarchical search will be described with reference to FIGS. 11A to 15.

Although not illustrated in FIG. 10, in some cases, the nonvolatile memory 1500 may store the image data DAT1. In this case, the electronic circuit 2000 may communicate with the nonvolatile memory 1500 to read the image data DAT1. Alternatively, the image data DAT1 of the nonvolatile memory 1500 may be loaded to the buffer memory 1400, and the electronic circuit 2000 may communicate with the buffer memory 1400.

For example, the electronic circuit 2000 may read data associated with reference patches indicated by candidate motion vectors which candidate blocks have, from the image data DAT1 of the buffer memory 1400 (and/or the nonvolatile memory 1500), to refer to the reference patches in the motion estimation. When an amount of data referenced for the motion estimation increases, a long time may be taken to read data from a memory and to process the read data. Accordingly, as a speed of processing data decreases, a time taken for the motion estimation may increase, and a large amount of power may be consumed to process data. In addition, as a bandwidth or a frequency for memory access increases, power consumption of a memory may increase.

Accordingly, in terms of performance and power consumption, reducing an amount of data referenced for the motion estimation may be advantageous to make user satisfaction high. Examples of reducing an amount of data in the motion estimation will be described with reference to FIGS. 11A to 15.

Figure 11A:
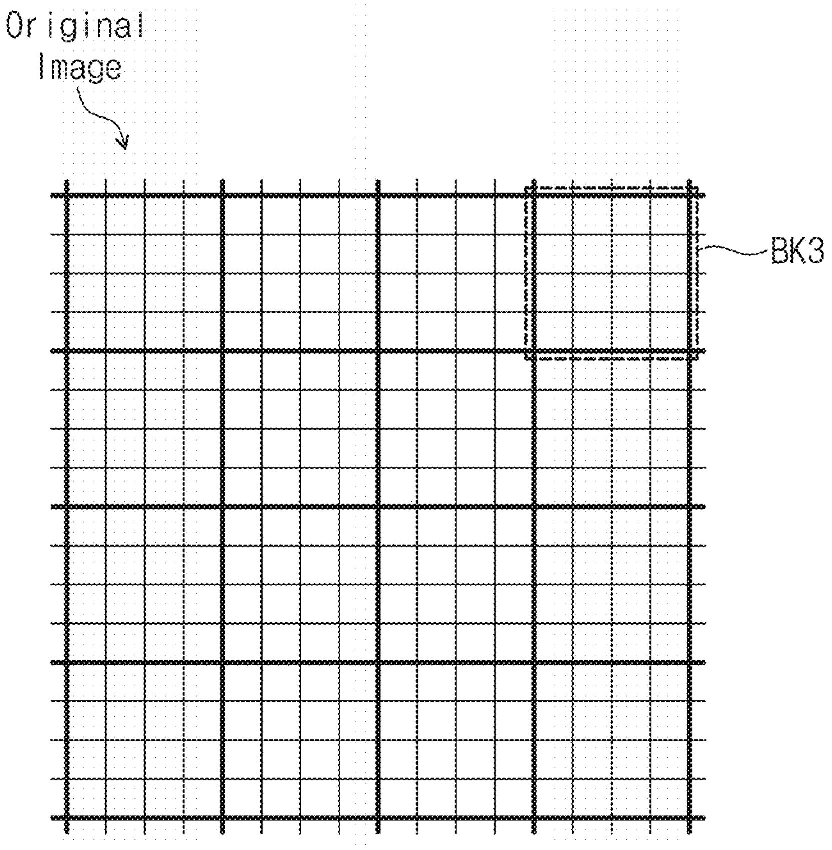
FIGS. 11A to 11C are conceptual diagrams illustrating examples of an original image and decimated images, which are referenced for motion estimation according to some example embodiments.
Figure 11B:
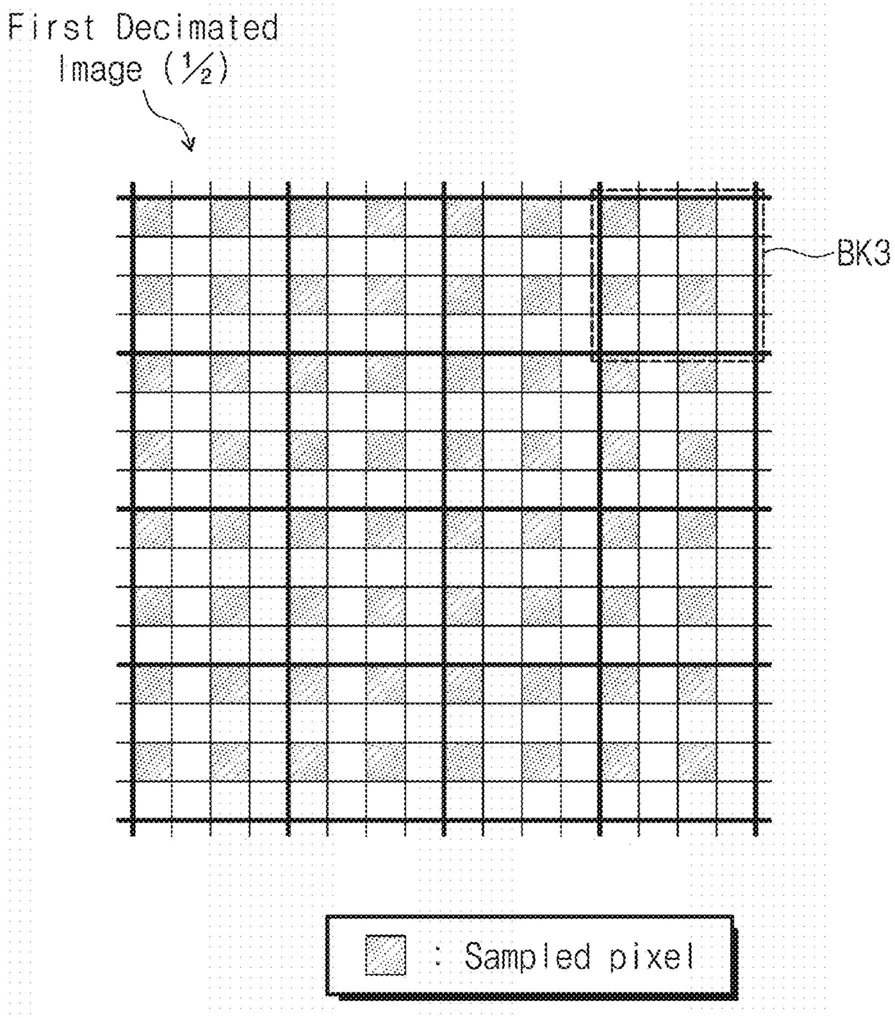
Figure 11C:
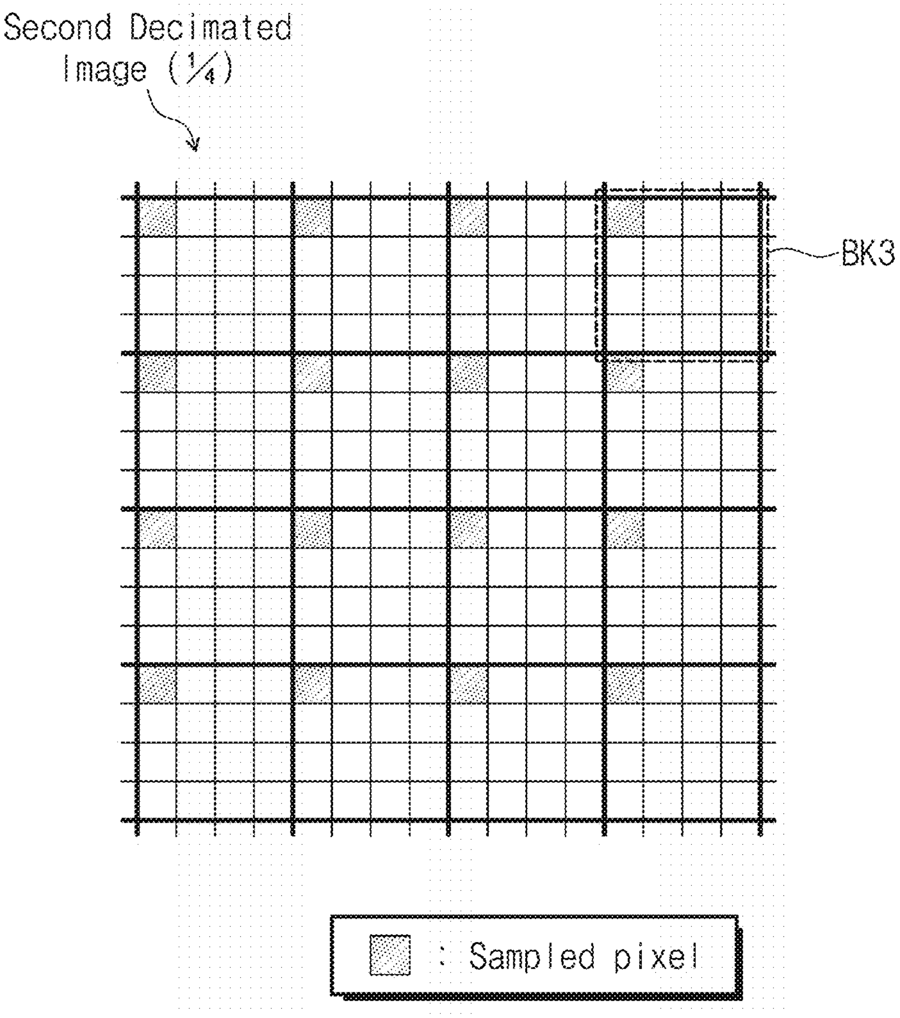

FIGS. 11A to 11C are conceptual diagrams illustrating examples of an original image and decimated images, which are referenced for motion estimation according to some example embodiments.

Referring to FIG. 11A, an original image may mean an image itself which is generated through the image processing block 1100 without modification or which is to be displayed on the display panel 1700 without modification. The original image may be partitioned into blocks, and each block may include a plurality of pixels. For example, the original image may include a block BK3, and the block BK3 may include a plurality of pixels.

In example embodiments, the motion estimation may generate decimated images from the original image. Herein, "decimate" or "decimation" may mean decreasing a sampling rate or down-sampling. The motion estimation may down-sampling the original image to generate each of the decimated images.

For example, referring to FIG. 11B, a first decimated image may be generated by down-sampling the original image such that the first decimated image has an image size corresponding to a half (½) of the original image. In this case, the number of pixels sampled with regard to the block BK3 of the first decimated image may be a quarter (¼) of the number of pixels included in the block BK3 of the original image.

For example, referring to FIG. 11C, a second decimated image may be generated by down-sampling n the original image such that the second decimated image has an image size corresponding to ¼ of the original image. In this case, the number of pixels sampled with regard to the block BK3 of the second decimated image may be 1/16 of the number of pixels included in the block BK3 of the original image.

The decimated images may be generated such that the decimated images have different resolutions. To this end, the decimated images may be generated by down-sampling the original image by different ratios. Each of the resolutions of the decimated images may be lower than a resolution of the original image. The resolution of the original image may be the highest resolution among resolutions of all images including the original image and the decimated images.

Coordinates on the original image may have a correspondence relationship with coordinates on each decimated image. For example, coordinates of pixels sampled with regard to the block BK3 of each of the decimated images of FIGS. 11B and 11C may correspond to coordinates of pixels included in the block BK3 of the original image of FIG. 11A.

In such a manner, the decimated images may be generated from the original image. Two decimated images are described herein (K=2), but the number of decimated images may be variously changed or modified, which will be described below. In addition, a down-sampling ratio for generating each decimated image may be variously changed or modified to be different from ¼ or 1/16. However, to facilitate better understanding, examples associated with the images of FIGS. 11A to 11C will be described below.

In example embodiments, the motion estimation may be performed with reference to each of images including an original image and decimated images, instead of being performed with regard to a single image. To this end, the processing circuitry may generate the decimated images through down-sampling in advance before referring to the decimated images, and data of the decimated images may be in advance stored in the buffer memory 1400 and/or the nonvolatile memory 1500 as the image data DAT1.

FIGS. 12A to 12D are conceptual diagrams illustrating examples of selecting some of candidate blocks in hierarchical-search-based motion estimation according to some example embodiments. FIG. 13 is a conceptual diagram for describing hierarchical-search-based motion estimation according to some example embodiments.

Hierarchical-search-based motion estimation (hereinafter referred to as "motion estimation") may refer to each of the images including the original image and the decimated images. The processing circuitry may determine a current block and candidate blocks with regard to each of the images. Each of the current block and the candidate blocks may be determined on corresponding coordinates on the original image and the decimated images.

On each decimated image, sizes of the current block and the candidate blocks may decrease in proportion to an amount decimated from the original image. On each decimated image, relative locations of the candidate blocks with respect to the current block may become closer to a current location of the current block in proportion to the amount decimated from the original image. In addition, on each decimated image, lengths of candidate motion vectors which the candidate blocks have may decrease in proportion to the amount decimated from the original image.

Figure 12A:
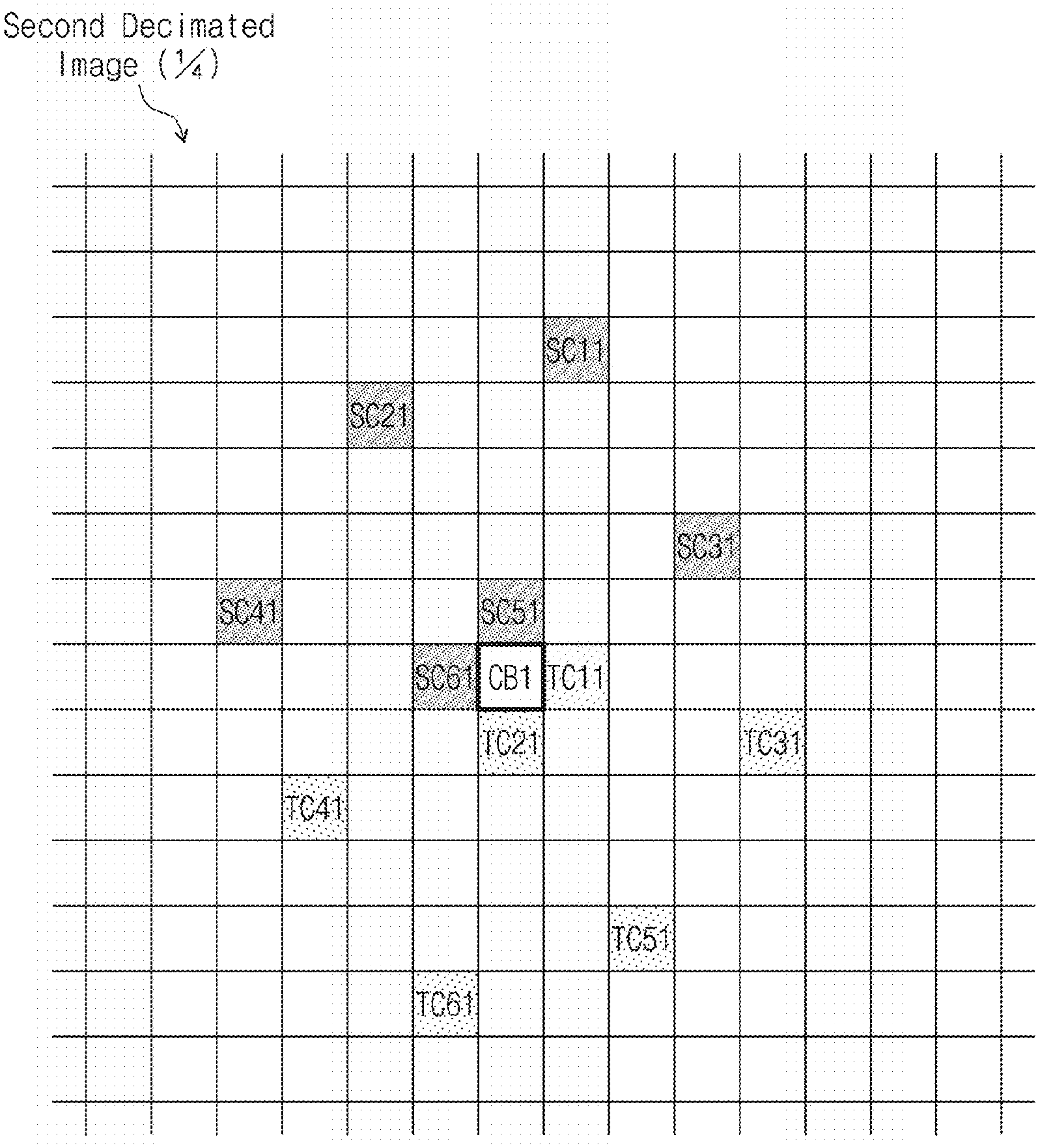
FIGS. 12A to 12D are conceptual diagrams illustrating examples of selecting some of candidate blocks in hierarchical-search-based motion estimation according to some example embodiments.
Figure 12B:
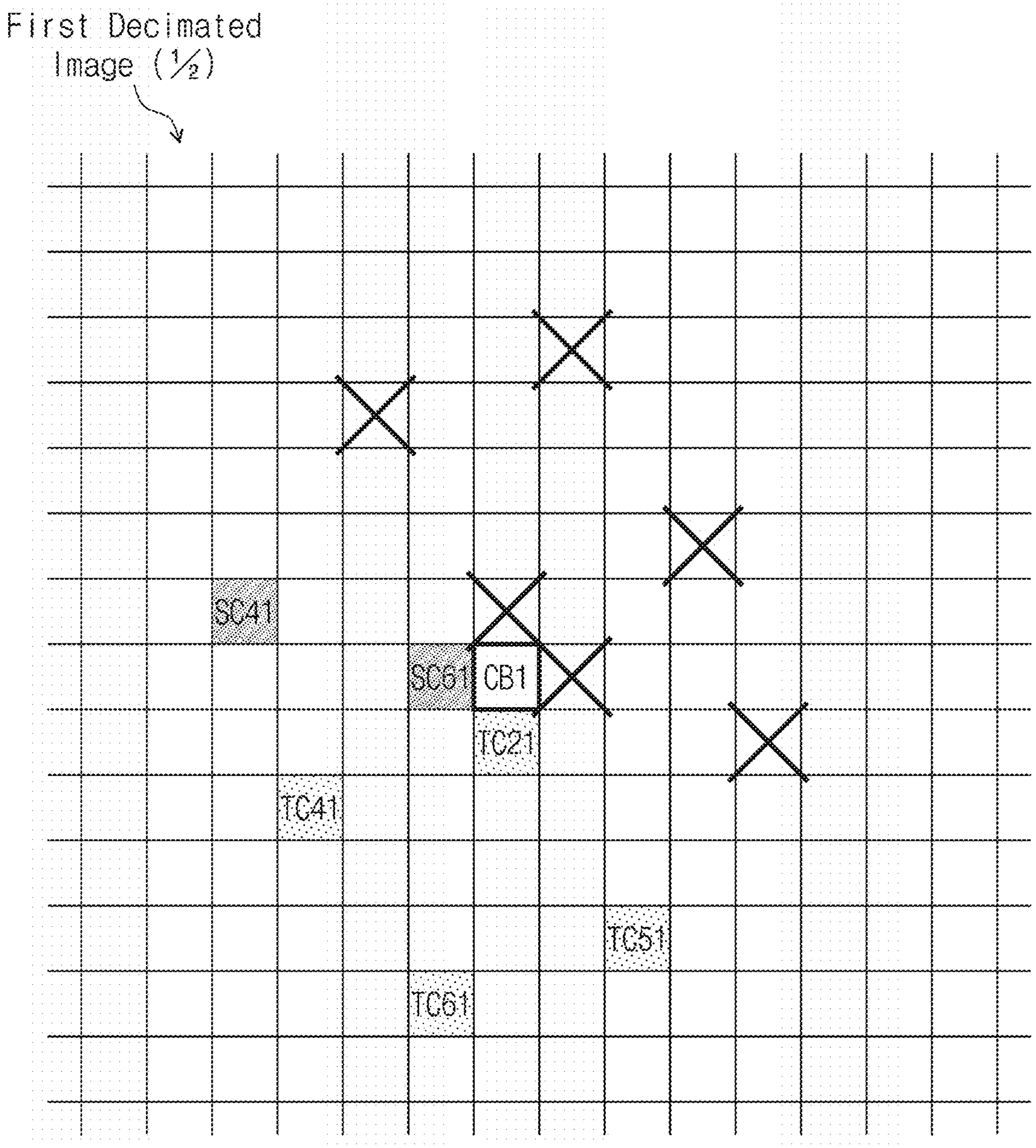
Figure 12C:
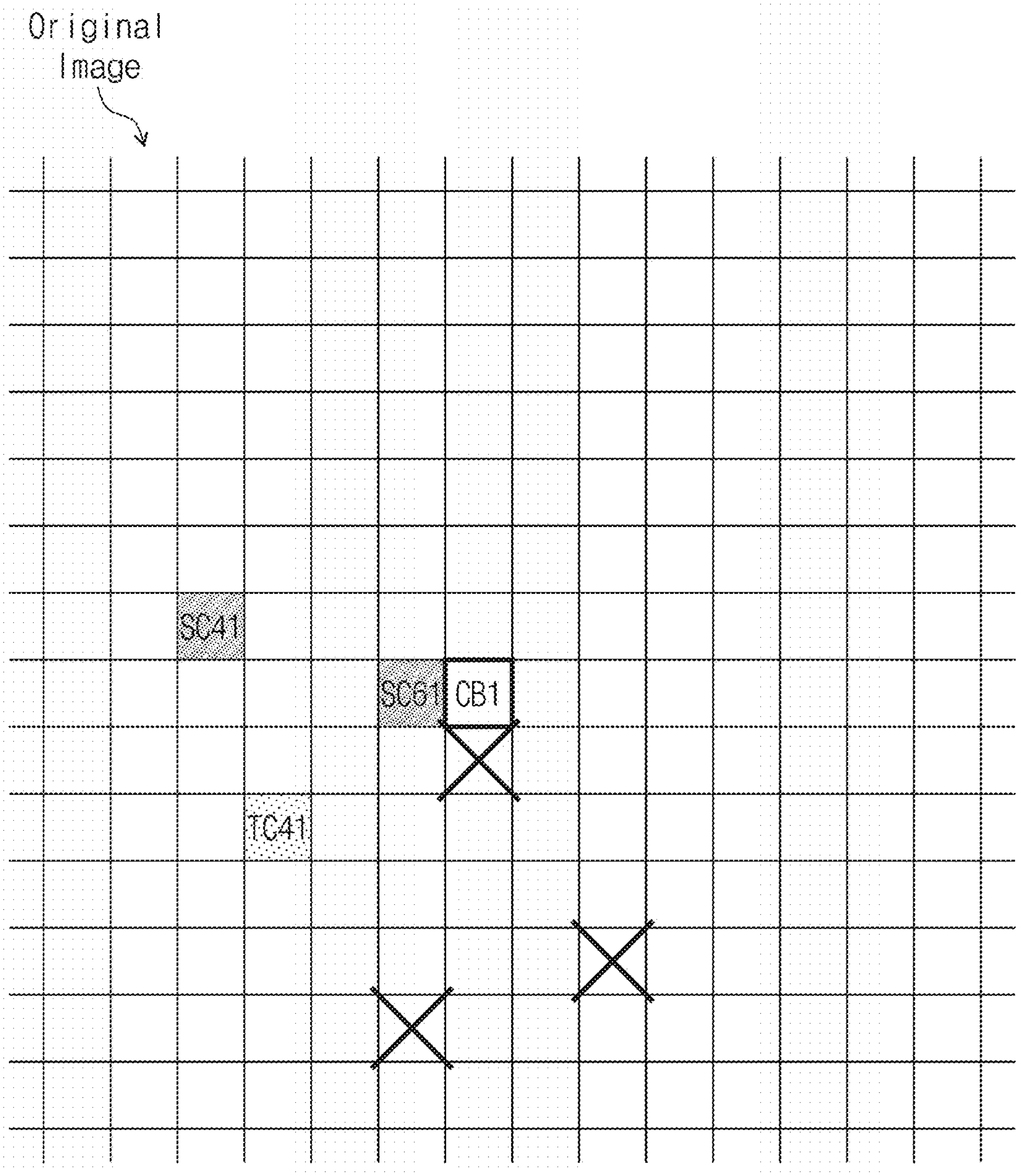
Figure 12D:
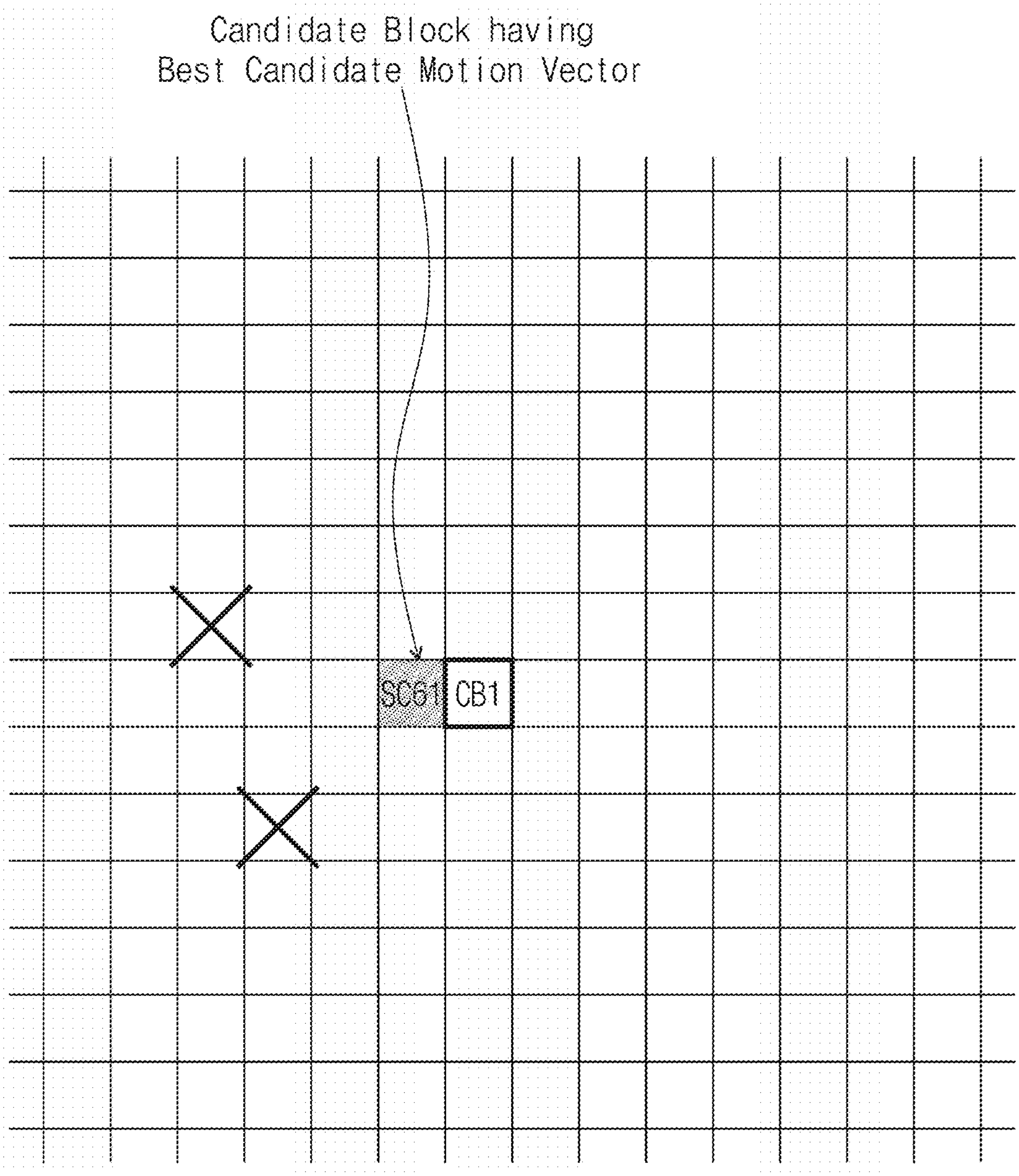
Figure 13:
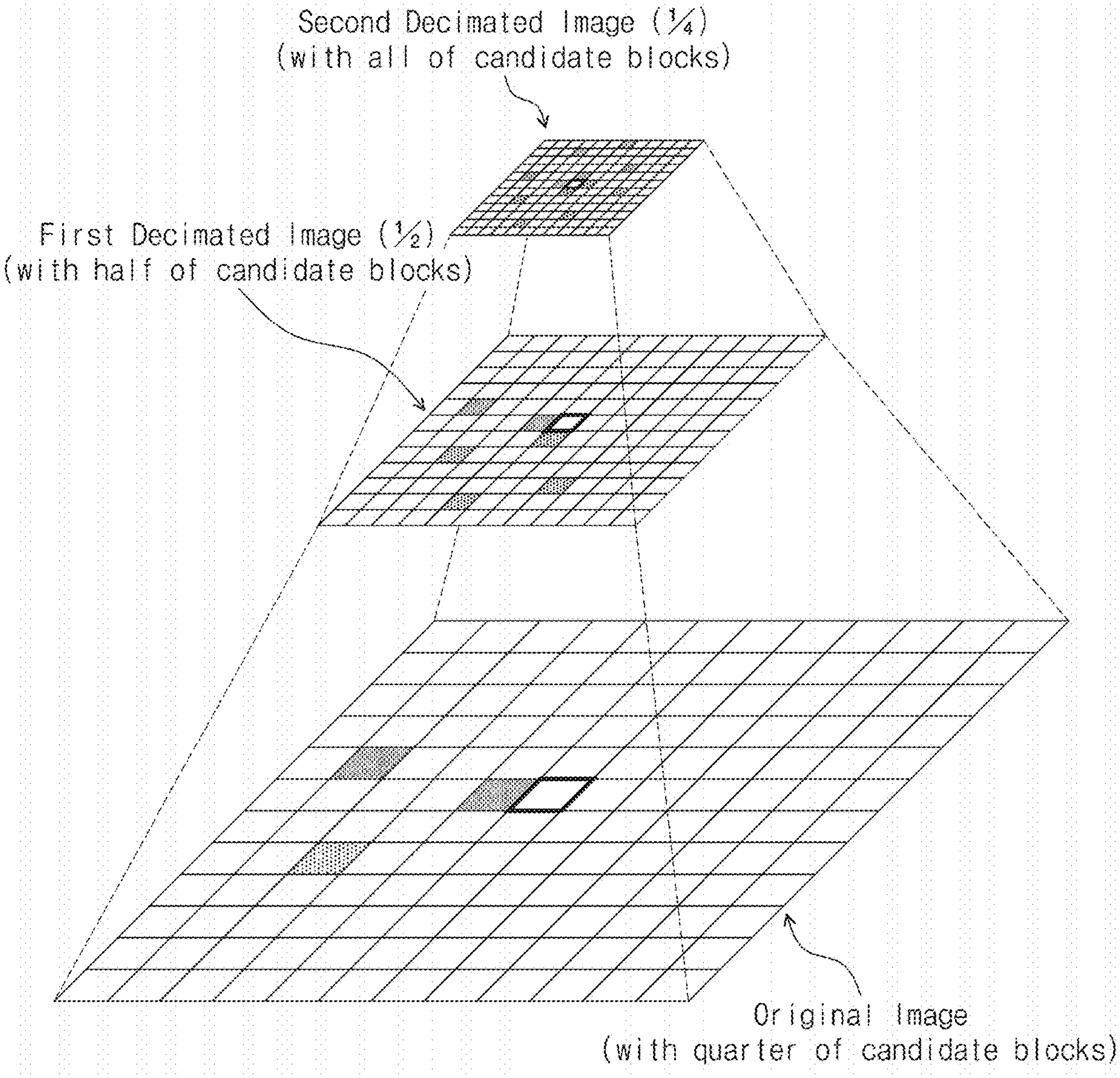
FIG. 13 is a conceptual diagram for describing hierarchical-search-based motion estimation according to some example embodiments.

For example, referring to FIG. 12A, the processing circuitry may first determine the candidate blocks SC11 to SC61 and TC11 to TC61 based on the location of the current block CB1 with regard to the second decimated image. With regard to the second decimated image, the processing circuitry may determine the candidate blocks SC11 to SC61 and TC11 to TC61 on relative locations with respect to the current location of the current block CB1 as described with reference to operation S110 and operation S120 of FIG. 4 and FIGS. 5A and 5B.

With regard to the second decimated image, instead of performing the full search for all pixels, the motion estimation may determine only some selected candidate blocks SC11 to SC61 and TC11 to TC61 and may refer to only candidate motion vectors of the selected candidate blocks SC11 to SC61 and TC11 to TC61. With regard to the second decimated image, as described with reference to FIG. 6 and operation S130 of FIG. 4, the motion estimation may calculate a similarity between the current block CB1 and each of reference patches indicated by candidate motion vectors of the candidate blocks SC11 to SC61 and TC11 to TC61.

The motion estimation may select some of the candidate blocks SC11 to SC61 and TC11 to TC61 based on the similarity. For example, the motion estimation may select candidate blocks, which have a half of candidate motion vectors corresponding to greater similarities, among the candidate blocks SC11 to SC61 and TC11 to TC61. Similarities between reference patches indicated by the candidate motion vectors of the selected candidate blocks and the current block CB1 may be greater than similarities between reference patches indicated by candidate motion vectors of unselected candidate blocks and the current block CB1.

The candidate blocks selected with regard to the second decimated image may be referenced with regard to the first decimated image immediately after the second decimated image is referenced. For example, referring to FIG. 12B, when the candidate blocks SC41, SC61, TC21, TC41, TC51, and TC61 are selected with regard to the second decimated image, the candidate blocks SC41, SC61, TC21, TC41, TC51, and TC61 may be used with regard to the first decimated image. On the other hand, candidate blocks which are not selected with regard to the second decimated image may be excluded without being used with regard to the first decimated image.

The processing circuitry may determine the candidate blocks SC41, SC61, TC21, TC41, TC51, and TC61 with regard to the first decimated image. With regard to the first decimated image, the motion estimation may calculate a similarity between the current block CB1 and each of reference patches indicated by candidate motion vectors of the candidate blocks SC41, SC61, TC21, TC41, TC51, and TC61. The motion estimation may select candidate blocks, which have a half of candidate motion vectors corresponding to greater similarities, among the candidate blocks SC41, SC61, TC21, TC41, TC51, and TC61.

The candidate blocks selected with regard to the first decimated image may be referenced with regard to the original image immediately after the first decimated image is referenced. For example, referring to FIG. 12C, when the candidate blocks SC41, SC61, and TC41 are selected with regard to the first decimated image, the candidate blocks SC41, SC61, and TC41 may be used with regard to the original image. On the other hand, candidate blocks which are not selected with regard to the first decimated image may be excluded without being used with regard to the original image.

The motion estimation may determine the candidate blocks SC41, SC61, and TC41 with regard to the original image. With regard to the original image, as described with reference to FIGS. 4 to 6, the processing circuitry may determine one reference patch indicated by the best candidate motion vector among candidate motion vectors of the candidate blocks SC41, SC61, and TC41. For example, referring to FIG. 12D, a candidate motion vector of the candidate block SC61 may be the best candidate motion vector.

Afterwards, as described with reference to FIG. 4 and FIGS. 7 to 8C, the motion estimation may perform the full search based on the reference patch indicated by the best candidate motion vector with regard to the original image, and may generate a motion vector for the current block CB1 based on a final reference patch determined from the full search.

Referring to FIG. 13, the processing circuitry may search for reference patches similar to the current block CB1 along layers of a hierarchical structure including the decimated images and the original image, and may apply the 3DRS manner described with reference to FIGS. 4 to 9 to the searched reference patches.

To this end, first, with regard to a decimated image having the lowest resolution among the decimated images (e.g., the second decimated image of FIG. 13), the processing circuitry may determine the current block CB1 and the candidate blocks SC11 to SC61 and TC11 to TC61 as described with reference to FIGS. 5A and 5B and operation S110 and operation S120 of FIG. 4.

Herein, the processing circuitry may determine the candidate blocks SC11 to SC61 and TC11 to TC61 at relative locations based on the location of the current block CB1 without the full search for all pixels with regard to the second decimated image, and may refer to reference patches indicated by candidate motion vectors of the determined candidate blocks SC11 to SC61 and TC11 to TC61. Accordingly, in comparison to a manner of performing the full search on a decimated image of the lowest resolution, an amount of data referenced for the motion estimation may decrease.

For example, the processing circuitry may read the image data DAT1 from a memory (e.g., the buffer memory 1400 and/or the nonvolatile memory 1500) to refer to the reference patches indicated by the candidate motion vectors of the candidate blocks SC11 to SC61 and TC11 to TC61 with regard to the second decimated image. An amount of the image data DAT1 read from the memory may be less than an amount of data for the full search.

The motion estimation may select some of candidate blocks determined with regard to each of decimated images. The some of the candidate blocks may be selected based on the current block CB1 and the candidate blocks (e.g., based on a similarity between the current block CB1 and each of reference patches indicated by candidate motion vectors of the candidate blocks).

For example, the processing circuitry may refer to the decimated images according to order from a decimated image of the lowest resolution (e.g., the second decimated image of FIG. 13) to a decimated image of the highest resolution (e.g., the first decimated image of FIG. 13). In addition, the motion estimation may select some of the candidate blocks with regard to each decimated image according to the order. For example, the motion estimation may select some of the candidate blocks by a ratio or the number which is set with regard to each of the decimated images.

For example, the motion estimation may select the candidate blocks SC41, SC61, TC21, TC41, TC51, and TC61 which are a half of the candidate blocks SC11 to SC61 and TC11 to TC61 determined with regard to the second decimated image. Similarities between reference patches indicated by candidate motion vectors of the selected candidate blocks SC41, SC61, TC21, TC41, TC51, and TC61 and the current block CB1 may be greater than similarities between reference patches indicated by candidate motion vectors of unselected candidate blocks and the current block CB1. Herein, the ratio of half for selecting some of candidate blocks is only an example to facilitate better understanding, and the ratio or the number may be variously changed or modified to be suitable for the motion estimation.

The selected candidate blocks SC41, SC61, TC21, TC41, TC51, and TC61 may be used with regard to the first decimated image which is referenced immediately after the second decimated image. The motion estimation may determine the candidate blocks SC41, SC61, TC21, TC41, TC51, and TC61 with regard to the first decimated image.

For example, the processing circuitry may select the candidate blocks SC41, SC61, and TC41 which are a half of the candidate blocks SC41, SC61, TC21, TC41, TC51, and TC61 determined with regard to the first decimated image. Similarities between reference patches indicated by candidate motion vectors of the selected candidate blocks SC41, SC61, and TC41 and the current block CB1 may be greater than similarities between reference patches indicated by candidate motion vectors of unselected candidate blocks and the current block CB1. The candidate blocks SC41, SC61, and TC41 selected with regard to the first decimated image may be some of the candidate blocks SC41, SC61, TC21, TC41, TC51, and TC61 selected with regard to the second decimated image.

The selected candidate blocks SC41, SC61, and TC41 may be used with regard to the original image which is referenced immediately after the first decimated image. The motion estimation may determine the candidate blocks SC41, SC61, and TC41 with regard to the original image. The number of the candidate blocks SC41, SC61, and TC41 determined with regard to the original image may be less (e.g., a quarter (¼)) than the number of the candidate blocks SC11 to SC61 and TC11 to TC61 determined with regard to the second decimated image.

In such a manner, the processing circuitry may select some of candidate blocks with regard to an image which is referenced earlier, and may use only the selected candidate blocks with regard to a next decimated image. As such, as some of the candidate blocks are selected based on each of the original image and the decimated images according to the order, the number of candidate blocks being used may gradually decrease. Accordingly, an amount of data referenced with regard to the original image may decrease.

The processing circuitry may generate the motion vector for the current block CB1 by using the candidate blocks SC41, SC61, and TC41 (e.g., by referring to reference patches indicated by candidate motion vectors of the candidate blocks SC41, SC61, and TC41). To this end, the processing circuitry may calculate a similarity between the current block CB1 and each of the reference patches indicated by the candidate motion vectors of the candidate blocks SC41, SC61, and TC41 determined with regard to the original image. The similarity may be calculated as described with reference to operation S130 of FIG. 4 and FIG. 6.

The processing circuitry may select one reference patch (e.g., which is indicated by the best candidate motion vector) from reference patches indicated by the candidate motion vectors of the candidate blocks SC41, SC61, and TC41 based on the similarity. The selected reference patch may have pixel values, which are the most similar to pixel values of the current block CB1, among reference patches indicated by the candidate motion vectors of the candidate blocks SC41, SC61, and TC41. As the number of candidate blocks decreases through the hierarchical search, the selected reference patch may be selected last from the reference patches indicated by the candidate motion vectors of the candidate blocks SC11 to SC61 and TC11 to TC61.

The processing circuitry may generate the motion vector for the current block CB1 based on the reference patch which is selected with regard to the original image. To this end, as described with reference to operation S150 FIG. 4 and FIGS. 7 and 8A to 8C, the motion estimation may perform the full search based on the reference patch selected with regard to the original image. However, selecting a reference patch may be understood as selecting a candidate block to determine a reference patch indicated by a candidate motion vector of the selected candidate block.

The processing circuitry may generate the motion vector for the current block CB1 based on a final reference patch which is determined from the full search. The motion vector for the current block CB1 may be obtained based on the final motion vector indicating the final reference patch.

Figure 14A:
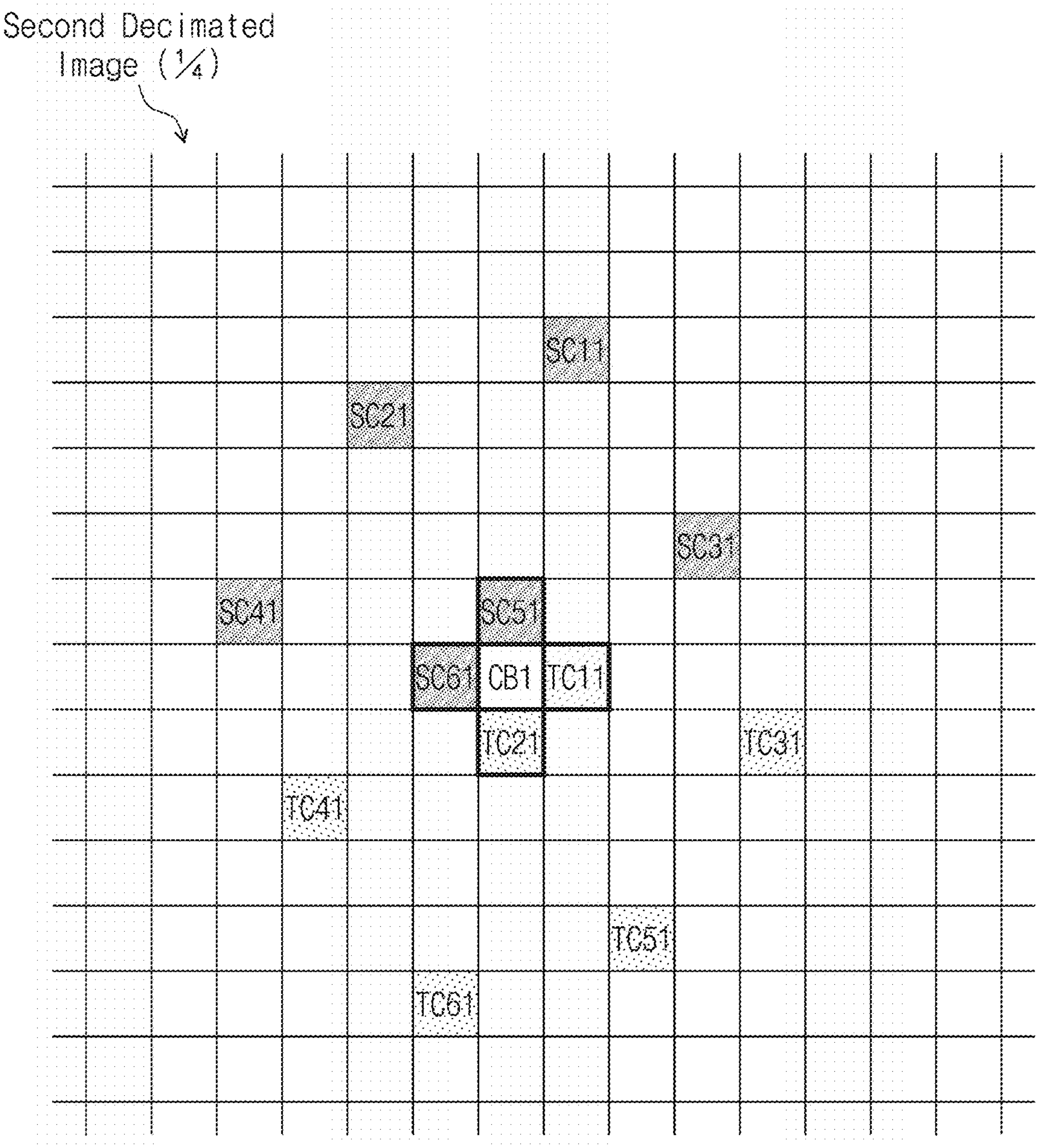
FIGS. 14A and 14B are conceptual diagrams illustrating examples of selecting some of candidate blocks in hierarchical-search-based motion estimation according to some example embodiments.
Figure 14B:
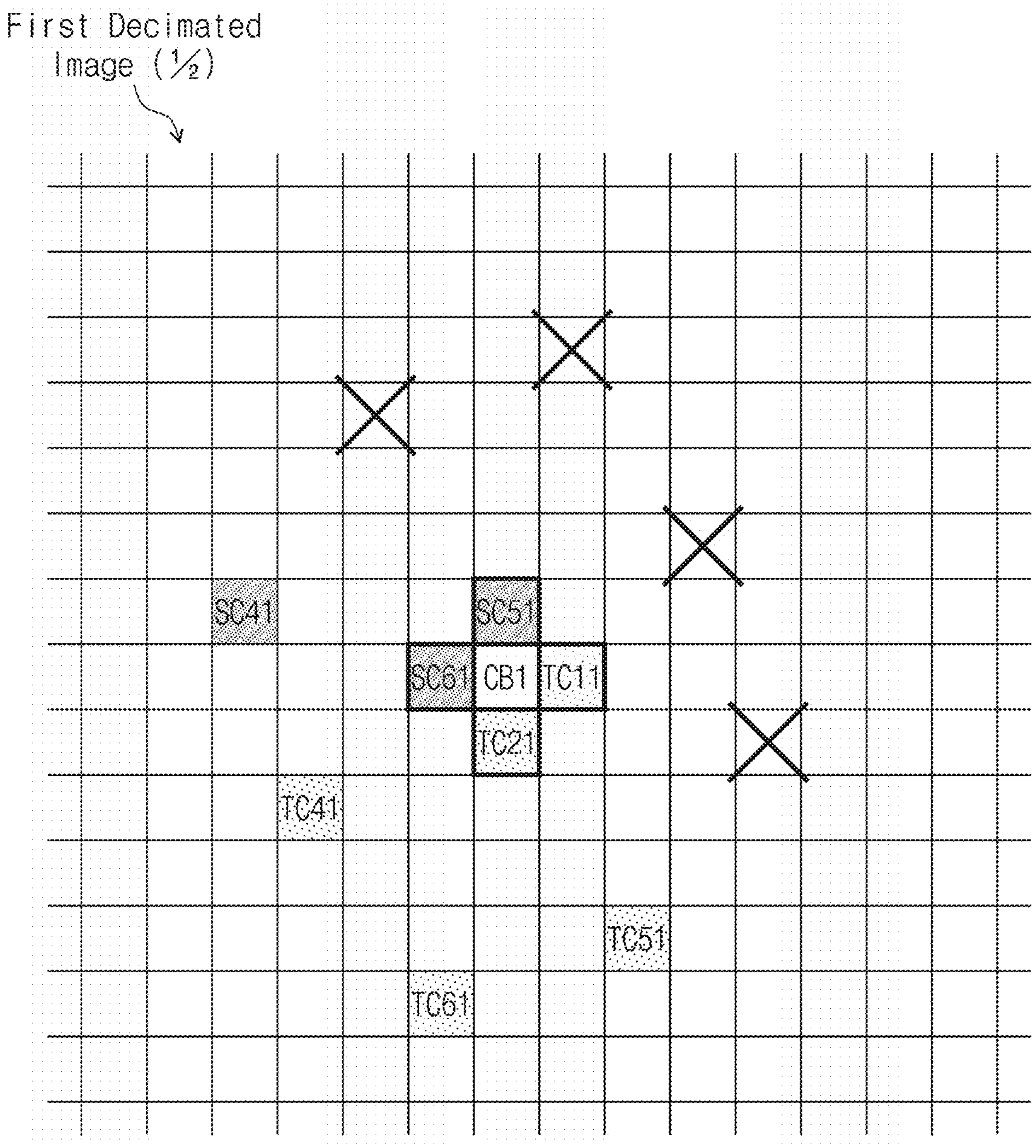

FIGS. 14A and 14B are conceptual diagrams illustrating examples of selecting some of candidate blocks in hierarchical-search-based motion estimation according to some example embodiments.

Referring to FIG. 14A, for example, it is likely that reference patches indicated by candidate motion vectors of the candidate blocks SC51, SC61, TC11, and TC21 at relative locations corresponding to coordinates which are adjacent to the current location of the current block CB1 is similar to the current block CB1 (thus, it is likely that the reference patches are suitable to generate the motion vector for the current block CB1).

In this regard, in some example embodiments, the candidate blocks SC51, SC61, TC11, and TC21 may be selected with regard to all the decimated images without being unselected. In some example embodiments, when the candidate blocks SC51, SC61, TC11, and TC21 are determined and selected with regard to all the decimated images, similarity calculation associated with reference patches indicated by candidate motion vectors of the candidate blocks SC51, SC61, TC11, and TC21 may be omitted.

On the other hand, the candidate blocks SC11 to SC41 and TC31 to TC61 at relative locations corresponding to coordinates which are not adjacent to the current location of the current block CB1 may be selected or unselected based on a similarity with respect to the current block CB1. As described above, only selected candidate blocks may be referenced with regard to a next image.

For example, referring to FIG. 14B, the selected candidate blocks may include the candidate blocks SC51, SC61, TC11, and TC21 at coordinates which are adjacent to a coordinate of the current block CB1. In addition, the motion estimation may select some (e.g., the candidate blocks SC41, TC41, TC51, and TC61) of candidate blocks at coordinates which are not adjacent to a coordinate of a current block. On the other hand, the motion estimation may not select other some of the candidate blocks at the coordinates which are not adjacent to the coordinate of the current block.

For example, the candidate blocks SC51, SC61, TC11, and TC21 may be selected with regard to the second decimated image without being unselected, and may be determined with regard to the first decimated image. However, each of the candidate blocks SC51, SC61, TC11, and TC21 may be determined or may not be determined as having the best candidate motion vector, based on a similarity calculated with regard to the original image.

The candidate blocks SC41, TC41, TC51, and TC61 may be selected with regard to the second decimated image based on a similarity, and may be determined with regard to the first decimated image. Other candidate blocks may not be selected with regard to the second decimated image, and may not be referenced with regard to the first decimated image.

Figure 15:
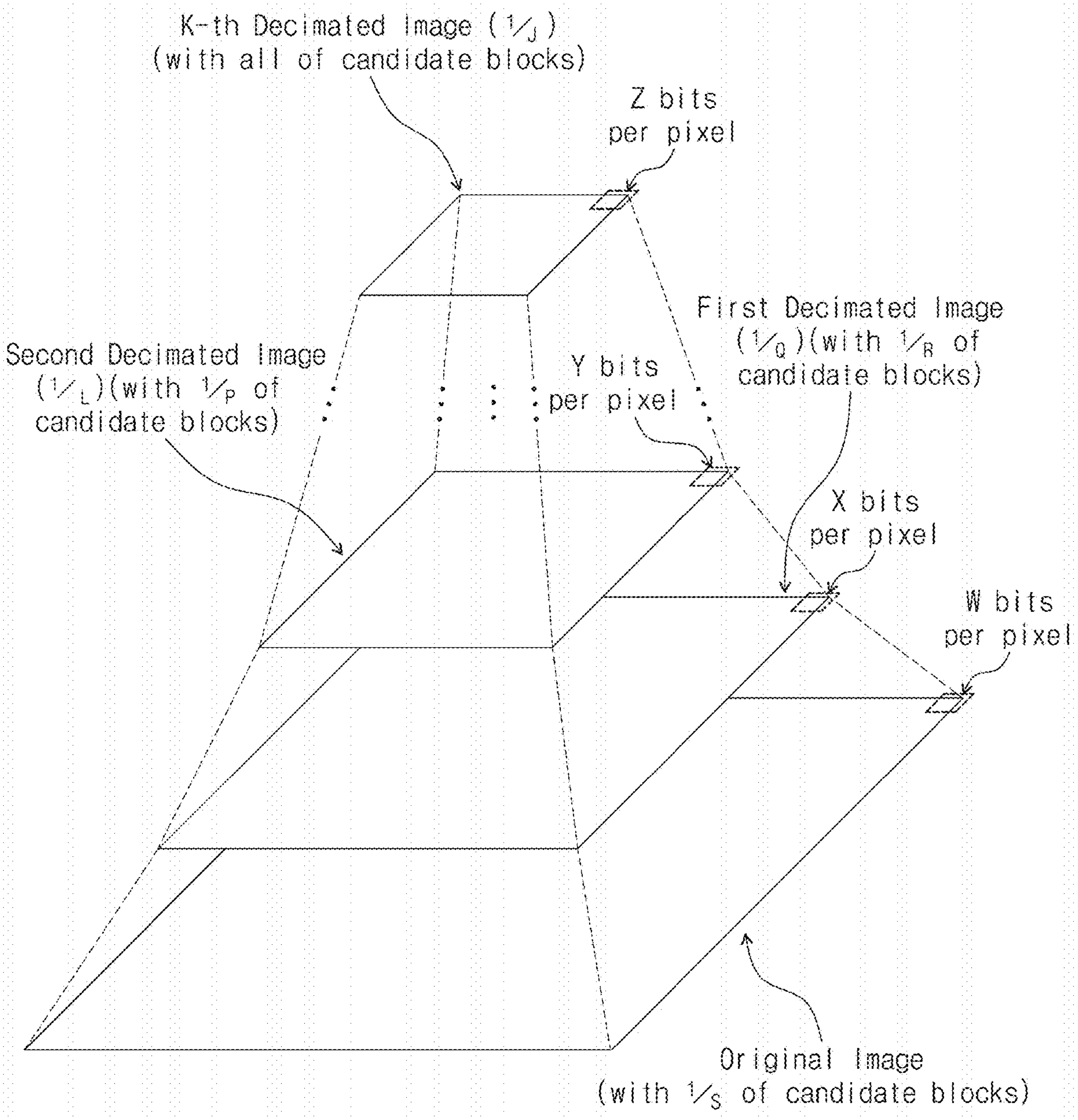
FIG. 15 is a conceptual diagram for describing hierarchical-search-based motion estimation according to some example embodiments.

FIG. 15 is a conceptual diagram for describing hierarchical-search-based motion estimation according to some example embodiments.

Two decimated images and the ratio of half for selecting candidate blocks have been described with reference to FIGS. 11 to 14, but the present disclosure is not limited thereto. The motion estimation may be variously changed or modified to employ selecting K decimated images and candidate blocks.

For example, a K-th decimated image may be generated by down-sampling an original image such that the K-th decimated image has an image size corresponding to 1/J of the original image (J being a positive real number), and may have the lowest resolution among decimated images. The motion estimation may determine a current block and candidate blocks with regard to the K-th decimated image. In example embodiments, only candidate blocks may be used without the full search for all pixels with regard to the K-th decimated image, and thus an amount of referenced data may decrease.

Some of candidate blocks may be selected with regard to the K-th decimated image, and the selected candidate blocks may be determined and referenced with regard to a (K−1)-th decimated image (not illustrated). In such a manner, 1/P of the candidate blocks may be selected with regard to a third decimated image (not illustrated) (P being a positive real number), and the selected candidate blocks may be determined and used with regard to a second decimated image.

The second decimated image may be generated by down-sampling the original image such that the second decimated image has an image size corresponding to 1/L of the original image (L being a positive real number). The motion estimation may select 1/R of the candidate blocks with regard to the second decimated image (R being a positive real number), and the selected candidate blocks may be determined and used with regard to a first decimated image.

The first decimated image may be generated by down-sampling the original image such that the first decimated image has an image size corresponding to 1/Q of the original image (Q being a positive real number: Q<L<J), and may have the highest resolution among the decimated images. The motion estimation may select 1/S of the candidate blocks with regard to the first decimated image (S being a positive real number), and the selected candidate blocks may be determined and used with regard to the original image. The motion estimation may generate a motion vector for a current block by using candidate blocks determined with regard to the original image.

In such a manner, as some of candidate blocks are selected according to order from a decimated image of the lowest resolution to a decimated image of the highest resolution, the number of candidate blocks being used may gradually decrease. Accordingly, an amount of data referenced with regard to the original image may decrease.

In some example embodiments, the numbers of bits for expressing pixels of respective images may be different from one another. For example, each pixel constituting the original image may be expressed based on W bits, and each pixel constituting the first decimated image may be expressed based on X bits. Each pixel constituting the second decimated image may be expressed based on Y bits, and each pixel constituting the K-th decimated image may be expressed based on Z bits (W, X, Y, and Z being a natural number).

Herein, Z may be smaller than Y, Y may be smaller than X, and X may be smaller than W. That is, a pixel of a decimated image having a lower resolution may be expressed based on the less number of bits. Accordingly, a similarity calculated with regard to the decimated image having the lower resolution may be obtained based on the less number of bits. In this case, an amount of data referenced for the motion estimation may decrease.

The number of candidate blocks, the number of decimated images, a resolution of each decimated image, a ratio or the number for selecting candidate blocks, the number of bits expressing a pixel of each image, and/or the like, may be variously changed or modified. For example, when it is intended to refer to the greater number of candidate blocks, more decimated images may be generated to have lower resolutions. Besides, numerical values may be variously changed or modified to be suitable for requirements of the motion estimation.

As described above, in example embodiments, an amount of data referenced for the motion estimation may decrease. In this case, a time taken to read data from a memory and to process the read data may decrease. Accordingly, as a speed of data processing is improved, a time taken for the motion estimation may decrease, and an amount of power consumed to process data may decrease. As a bandwidth or a frequency for memory access decreases, power consumption of a memory may decrease. Even though an amount of data decreases, as the hierarchical search is employed, accuracy of the motion estimation may not be degraded or degradation in the accuracy of the motion estimation may be minimized.

Figure 16:
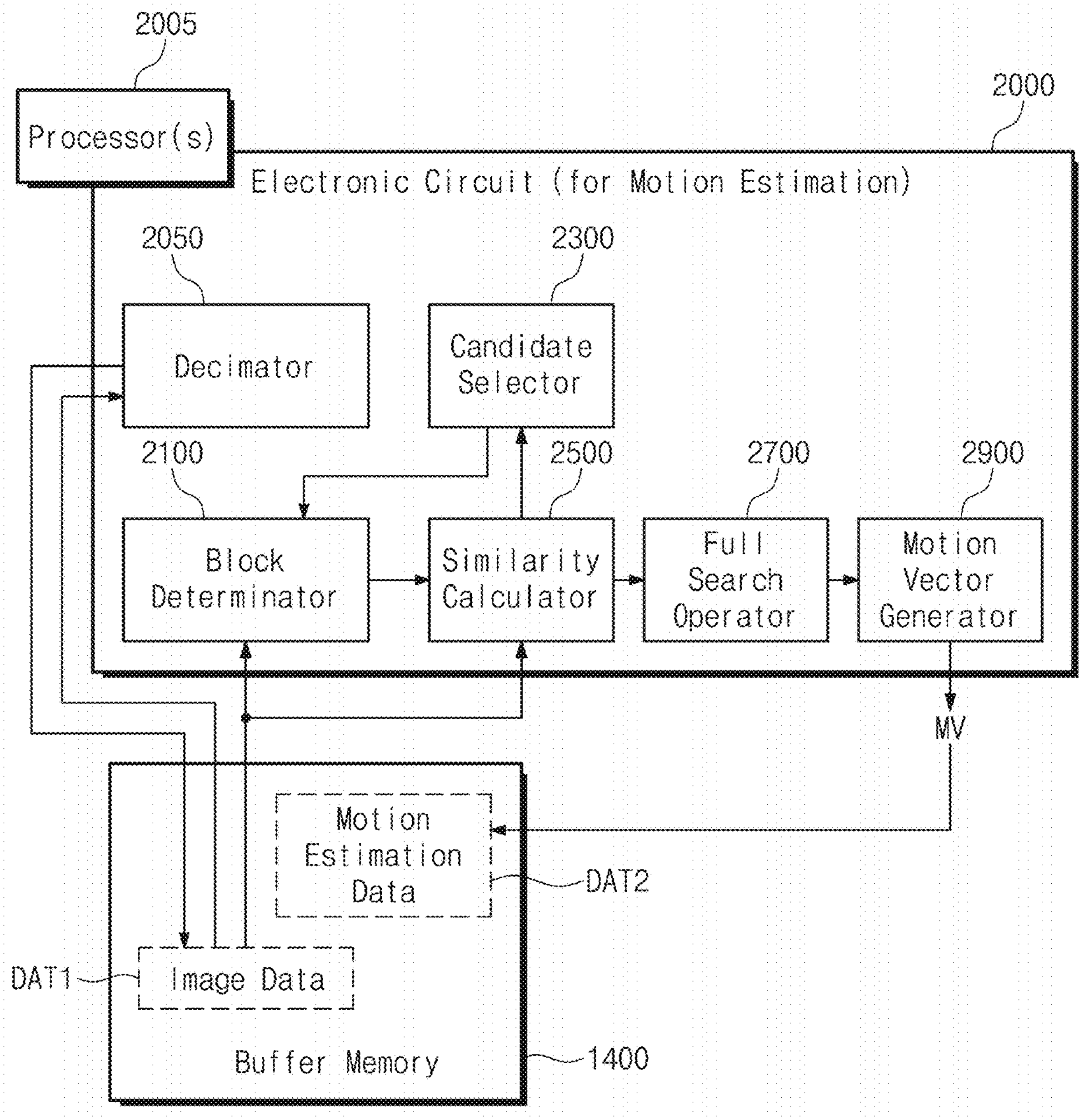
FIG. 16 is a block diagram illustrating an example configuration for performing hierarchical-search-based motion estimation according to some example embodiments.
Figure 17:
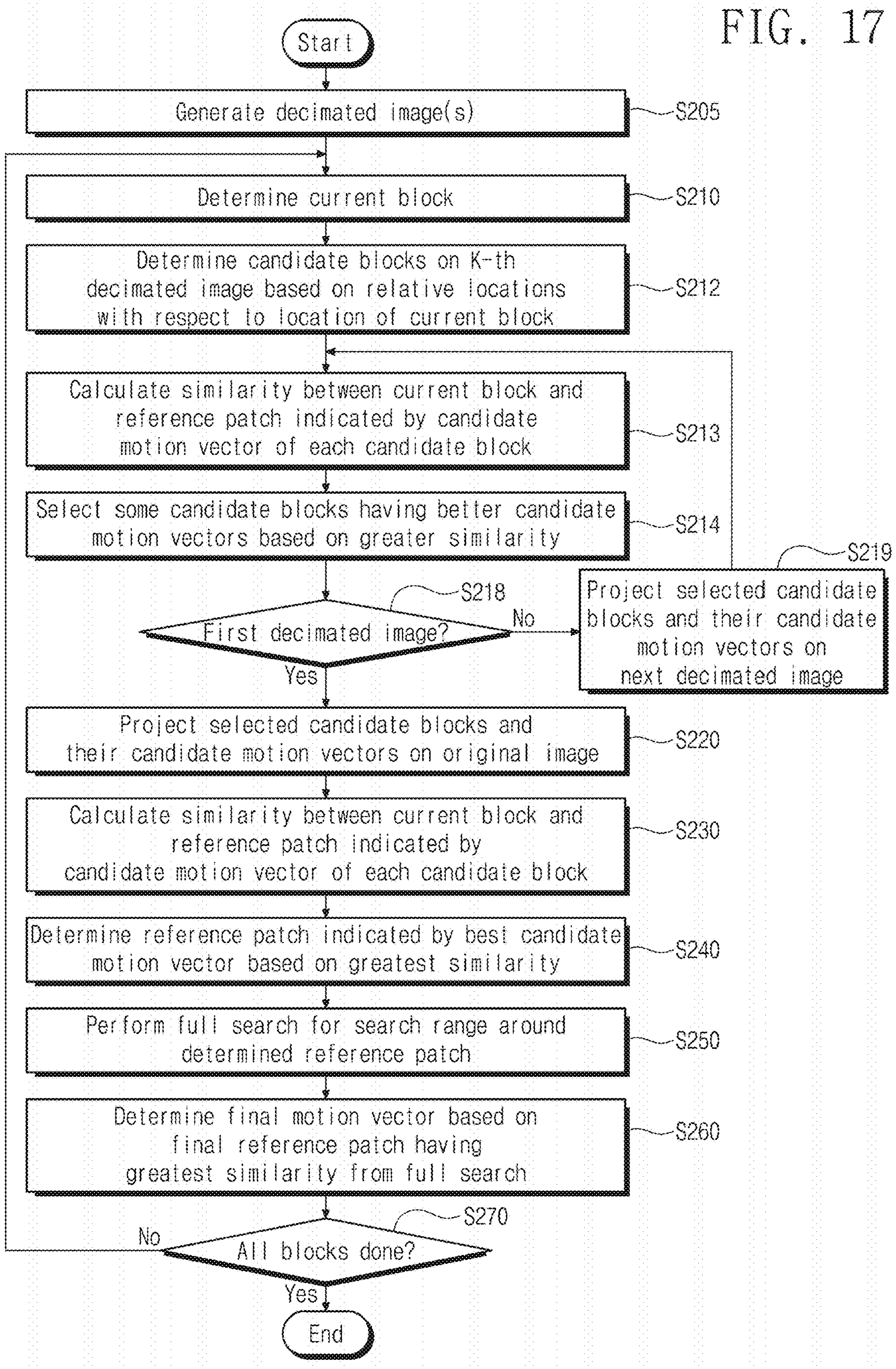
FIG. 17 is a flowchart describing example operations for performing hierarchical-search-based motion estimation according to some example embodiments.

FIG. 16 is a block diagram illustrating an example configuration for performing hierarchical-search-based motion estimation according to some example embodiments. FIG. 17 is a flowchart describing example operations for performing hierarchical-search-based motion estimation according to some example embodiments.

Referring to FIG. 16, in some example embodiments, the electronic circuit 2000 may include a decimator 2050, a block determinator 2100, a candidate selector 2300, a similarity calculator 2500, a full search operator 2700, and a motion vector generator 2900. The decimator 2050, the block determinator 2100, the candidate selector 2300, the similarity calculator 2500, the full search operator 2700, and the motion vector generator 2900 may be implemented in hardware circuits configured to perform operations described in the present disclosure.

Additionally or alternatively, the decimator 2050, the block determinator 2100, the candidate selector 2300, the similarity calculator 2500, the full search operator 2700, and the motion vector generator 2900 may be implemented by execution of software. As one or more processors (e.g., the main processor 1800, separate processor(s) 2005 for the electronic circuit 2000, and/or the like) executes the software, the one or more processors may be transformed to special purpose processors to perform operations of the decimator 2050, the block determinator 2100, the candidate selector 2300, the similarity calculator 2500, the full search operator 2700, and the motion vector generator 2900 may be caused.

In operation S205, the decimator 2050 may generate decimated images from an original image based on the image data DAT1, which may be substantially identical or similar to those described with reference to FIGS. 11A to 11C. The decimated images may be stored as a portion of the image data DAT1.

In operation S210, the block determinator 2100 may determine a current block based on the image data DAT1. In addition, in operation S212, the block determinator 2100 may determine candidate blocks with regard to the K-th decimated image of the lowest resolution. Operations S210 and S212 may be substantially identical or similar to those described with reference to operation S110 and operation S120 of FIG. 4, and FIGS. 5A, 5B, 12A, and 13.

In operation S213, the similarity calculator 2500 may calculate a similarity between the current block determined by the block determinator 2100 and each of reference patches indicated by candidate motion vectors of the candidate blocks with regard to each of the decimated images based on the image data DAT1, which may be substantially identical or similar to those described with reference to operation S130 of FIG. 4 and FIGS. 6 and 13.

In operation S214, the candidate selector 2300 may select candidate blocks which have candidate motion vectors corresponding to greater similarities by a set ratio or the set number, based on the similarity calculated by the similarity calculator 2500, with regard to each of the decimated images, which may be substantially identical or similar to those described with reference to FIGS. 12A to 12D and FIG. 13.

When candidate block selection is not performed with regard to the first decimated image of the highest resolution (No of S218 of FIG. 17), in operation S219, the block determinator 2100 may determine the candidate blocks selected by the candidate selector 2300 with regard to a next decimated image, and may project the selected candidate blocks and their candidate motion vectors to the next decimated image. Accordingly, similarity calculation and candidate block selection may be repeated with regard to the next decimated image (S213 and S214 of FIG. 17). These may be substantially identical or similar to those described with reference to FIGS. 12A to 12D and FIG. 13.

When candidate block selection is performed with regard to the first decimated image of the highest resolution (Yes of S218 of FIG. 17), in operation S220, the block determinator 2100 may determine candidate blocks with regard to the original image, and may project the determined candidate blocks and their candidate motion vectors to the original image.

In operation S230, the similarity calculator 2500 may calculate a similarity between the current block and each of the reference patches indicated by the candidate motion vectors of the candidate blocks with regard to the original image. In addition, in operation S240, the similarity calculator 2500 may determine a reference patch indicated by the best candidate motion vector based on the greatest similarity. These may be substantially identical or similar to those described with reference to FIGS. 12A to 12D and FIG. 13.

In operation S250, The full search operator 2700 may perform the full search for a search area around the reference patch determined by the similarity calculator 2500, which may be substantially identical or similar to those described with reference to operation S150 of FIG. 4, and FIGS. 7 and 8A to 8C.

In operation S260, the motion vector generator 2900 may determine a final reference patch within the search area based on a result of the full search of the full search operator 2700, which may be substantially identical or similar to those described with reference to operation S160 of FIG. 4, and FIGS. 7 and 8A to 8C.

The motion vector generator 2900 may generate a motion vector MV for the current block based on a final motion vector indicating the final reference patch. Data of the motion vector MV may be stored in the buffer memory 1400 and/or the nonvolatile memory 1500 as motion estimation data DAT2. The motion estimation data DAT2 may be referenced to perform a function or an operation of the ISP 1130, the FRC 1730, the CODEC 1830, and/or another component.

When motion vectors are not generated with regard to all the blocks constituting the image of the current frame (No of operation S270 of FIG. 17), operation S205 to operation S260 may be performed on a block where a motion vector is not generated. To this end, the block determinator 2100 may newly determine a current block such that a current location on the image of the current frame moves to correspond to a block where a motion vector is not generated. After motion vectors for all blocks constituting the image of the current frame are generated (Yes of S270 of FIG. 17), recursions for the blocks constituting the image may be completed.

Figure 18:
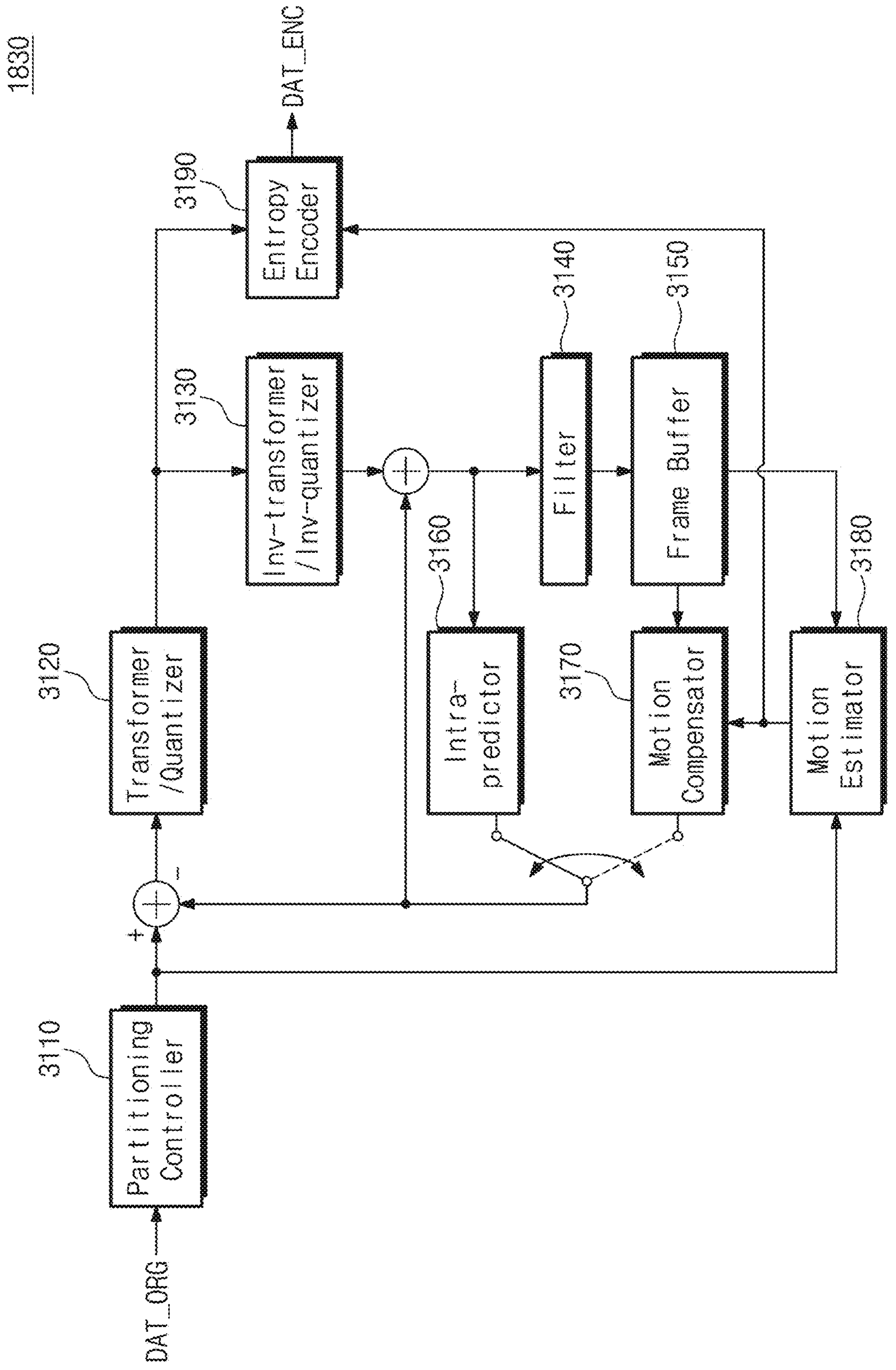
FIG. 18 is a block diagram illustrating an example configuration of a CODEC of FIG. 1.

FIG. 18 is a block diagram illustrating an example configuration of the CODEC 1830 of FIG. 1.

For example, the CODEC 1830 may be implemented in an electronic circuit for encoding and decoding video data in compliance with a video processing standard (e.g., HEVC/H265, VP9, and/or the like). To this end, for example, the CODEC 1830 may include a partitioning controller 3110, a transformer/quantizer 3120, an inverse-transformer/inverse-quantizer 3130, a filter 3140, a frame buffer 3150, an intra-predictor 3160, a motion compensator 3170, a motion estimator 3180, and an entropy encoder 3190.

Each component of the CODEC 1830 may include a hardware circuit configured to perform operations to be described below. Additionally or alternatively, as instructions for implementing each component of the CODEC 1830 are executed by one or more processors, the one or more processors may cause operations to be described below.

The partitioning controller 3110 may receive original data DAT_ORG. The original data DAT_ORG may include data referenced to display an image or a video on the display panel 1700. The partitioning controller 3110 may partition the original data DAT_ORG to generate data of a transformation unit including residual data and data of a prediction unit referenced for intra-prediction and/or motion compensation.

The transformer/quantizer 3120 may receive the residual data. The residual data may correspond to a difference between an output from the partitioning controller 3110 and an output from one of the intra-predictor 3160 and the motion compensator 3170. The transformer/quantizer 3120 may transform and quantize the residual data to generate transformed data. The inverse-transformer/inverse-quantizer 3130 may inverse-transform and inverse-quantize the transformed data to recover the residual data.

The filter 3140 may receive a sum of the recovered residual data and an output from one of the intra-predictor 3160 and the motion compensator 3170. The filter 3140 may include a deblocking filter for removing a noise included at a boundary between blocks, a sample adaptive offset filter for compensating for distortion between a frame of the original data DAT_ORG and a frame of the recovered data, an adaptive loop filter for compensating for information loss occurring during encoding, and/or the like.

The frame buffer 3150 may buffer data of a previous frame of the original data DAT_ORG. For example, the buffer memory 1400 and/or the nonvolatile memory 1500 may be used as the frame buffer 3150. The buffered data may be referenced together with data of a current frame by the motion compensator 3170 and the motion estimator 3180.

The intra-predictor 3160 may receive a sum of the recovered residual data and an output from one of the intra-predictor 3160 and the motion compensator 3170. The intra-predictor 3160 may obtain prediction data for a prediction target block, by using a block which is adjacent to the prediction target block of the current frame of the original data DAT_ORG. Intra-prediction may be performed based on blocks included in one frame.

Similar to those described with reference to FIGS. 2 to 16, the motion estimator 3180 may perform inter-prediction between an image of a current frame and an image of a previous frame. The motion estimator 3180 may generate motion vectors corresponding to blocks constituting the image of the current frame.

The motion compensator 3170 may obtain prediction data detected by the inter-prediction. One of the prediction data obtained by the intra-prediction and the prediction data obtained by the inter-prediction may be used for the transformer/quantizer 3120 and the filter 3140.

The motion vectors generated by the motion estimator 3180 and the residual data generated by the transformer/quantizer 3120 may be provided to the entropy encoder 3190. The entropy encoder 3190 may generate encoded data DAT_ENC based on the motion vectors and the residual data. For example, the encoded data DAT_ENC may be stored in the buffer memory 1400 and/or the nonvolatile memory 1500. The encoded data DAT_ENC may be referenced to display visual information on the display panel 1700.

Figure 19:
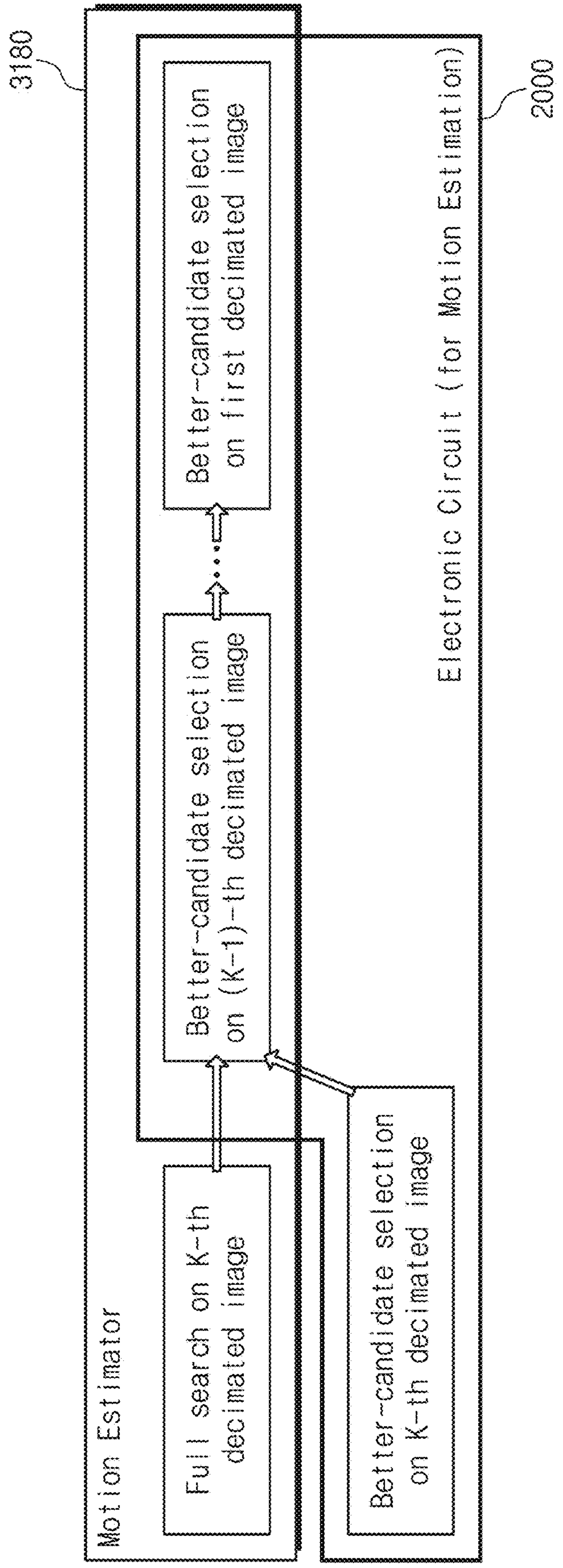
FIG. 19 is a conceptual diagram for describing a relationship between motion estimation according to some example embodiments and video encoding.

FIG. 19 is a conceptual diagram for describing a relationship between motion estimation according to some example embodiments and video encoding.

As described with reference to FIGS. 10 to 17, the electronic circuit 2000 may perform hierarchical-search-based motion estimation according to example embodiments to generate a motion vector. For example, the electronic circuit 2000 may select candidate blocks which are more similar to a current block according to the order from the K-th decimated image to the first decimated image.

As described with reference to FIG. 18, the CODEC 1830 may include the motion estimator 3180 to perform video encoding and decoding based on the motion estimation. In some example embodiments, the motion estimator 3180 may also perform hierarchical-search-based motion estimation. For example, the motion estimator 3180 may perform the full search with regard to the K-th decimated image, and may select candidate blocks which are more similar to a current block according to an order from the (K−1)-th decimated image to the first decimated image.

In some example embodiments, all or some of hardware components of the motion estimator 3180 configured to perform the motion estimation in the CODEC 1830 may be shared by the electronic circuit 2000. For example, the CODEC 1830 and the electronic circuit 2000 may perform the motion estimation by using the shared hardware components with regard to the (K−1)-th decimated image to the first decimated image. However, with regard to the K-th decimated image, the electronic circuit 2000 may perform candidate block selection, instead of the full search, by using independent hardware components.

However, the present disclosure is not limited to the above descriptions. In some example embodiments, the motion estimator 3180 may also perform candidate block selection instead of the full search with regard to the K-th decimated image. In this case, the CODEC 1830 and the electronic circuit 2000 may share the same hardware components.

The above descriptions are intended to provide example configurations and operations for implementing the present disclosure. The present disclosure may include implementations which may be obtained by simply changing or modifying the above example embodiments, in addition to the above-described example embodiments. Also, the present disclosure may include implementations which may be accomplished by easily changing or modifying the above-described example embodiments in the future.

What is claimed is:

1. An electronic circuit configured to perform motion estimation between images, the electronic circuit comprising:

processing circuitry configured to, determine a current block and candidate blocks with regard to each of decimated images, the decimated images being generated from an original image such that the decimated images have resolutions that are different, the decimated images including a first decimated image having a first resolution which is a lowest resolution among the resolutions and a second decimated image having a second resolution which is a highest resolution amongst the resolutions, determine a first number of first candidate blocks based on a location of the current block without a full search for all pixels with regard to the first decimated image of a first resolution which is a lowest resolution among the resolutions, select some of the candidate blocks for each of the decimated images by referring to the decimated images in order from the first decimated image to the second decimated image such that i) the first candidate blocks selected with regard to the first decimated image are used to select a second number of second candidate blocks with regard to a decimated image immediately thereafter, and (ii) the candidate blocks which are not selected with regard to the first decimated image are not used to select the candidate blocks with regard to the decimated image immediately thereafter such that the second number of the second candidate blocks is less than the first number of the first candidate blocks, and generate a motion vector for the current block based on one reference patch, the one reference patch being determined from reference patches which are indicated by candidate motion vectors of the second candidate blocks.

2. The electronic circuit of claim 1, wherein each of the resolutions is lower than a resolution of the original image.

3. The electronic circuit of claim 1, wherein coordinates on the original image have a correspondence relationship with coordinates on each of the decimated images, and the processing circuitry is configured to, determine the current block and the candidate blocks such that the current block and the candidate blocks are determined on corresponding coordinates on the original image and the decimated images.

4. The electronic circuit of claim 1, wherein the processing circuitry is configured to decrease a number of the candidate blocks by selecting the some of the candidate blocks in order from the first decimated image of the first resolution to the second decimated image of the second resolution.

5. The electronic circuit of claim 1, wherein the processing circuitry is configured to select the some of the candidate blocks based on a similarity between the current block and each of reference patches, the reference patches being indicated by candidate motion vectors of the candidate blocks.

6. The electronic circuit of claim 5, wherein the processing circuitry is configured to calculate the similarity based on a sum of differences between pixel values of the current block and pixel values of each of the reference patches indicated by the candidate motion vectors of the candidate blocks.

7. The electronic circuit of claim 1, wherein the one reference patch has pixel values, which are most similar to pixel values of the current block, among the reference patches indicated by the candidate motion vectors of the second candidate blocks, and with regard to the original image, the processing circuitry is configured to determine the current block and the second candidate blocks, and to select one candidate block from the second candidate blocks.

8. The electronic circuit of claim 1, wherein the processing circuitry is configured to, determine a final reference patch based on a similarity between first pixels in addition to second pixels and third pixels, the first pixels constituting the one reference patch, the second pixels being determined based on locations of the first pixels on the original image, the third pixels constituting the current block, and obtain the motion vector based on a final motion vector indicating the final reference patch.

9. The electronic circuit of claim 1, wherein a third number of bits for expressing each pixel constituting the first decimated image is less than a fourth number of bits for expressing each pixel constituting the second decimated image, and the fourth number of bits is less than a fifth number of bits for expressing each pixel constituting the original image.

10. An electronic device comprising:

a memory configured to store first data of images of different resolutions including a first image of a first resolution and a second image of a second resolution, the first resolution being a lowest resolution among resolutions, the second resolution being a highest resolution among the resolutions; and a first electronic circuit configured to, determine, with regard to the first image, candidate blocks based on a location of a current block on the images without a full search for all pixels, the candidate blocks having candidate motion vectors indicating reference patches select some of the candidate blocks based on the current block and the reference patches by referring to the images in order from the first image to the second image such that (i) the candidate blocks selected with regard to a respective one of the images from the first image to the second image are used with regard to an image immediately thereafter, and (ii) the candidate blocks which are not selected with regard to the respective one of the images are not used with regard to the image immediately thereafter, and generate a motion vector for the current block based on a reference patch indicated by a candidate motion vector of one candidate block which is selected with regard to the second image.

11. The electronic device of claim 10, wherein the first electronic circuit is configured to generate each of images other than the second image among the images by down-sampling the second image.

12. The electronic device of claim 10, wherein the first electronic circuit is configured to select some of the candidate blocks by referring to the images according to the order such that (i) first candidate blocks selected with regard to a third image among the images are used with regard to a fourth image immediately after the third image is referenced, and (ii) second candidate blocks which are not selected with regard to the third image are not used with regard to the fourth image.

13. The electronic device of claim 12, wherein the first electronic circuit is configured to select third candidate blocks with regard to the fourth image such that the third candidate blocks are some of the first candidate blocks.

14. The electronic device of claim 12, wherein the first candidate blocks include fourth candidate blocks where motion vectors have already been generated and fifth candidate blocks where motion vectors are not yet generated, the memory is configured to further store second data of a fifth image provided as a previous frame of the second image, and the first electronic circuit is configured to refer to the fourth candidate blocks based on the first data, and to refer to the fifth candidate blocks based on the second data.

15. The electronic device of claim 10, wherein the first electronic circuit is configured to, select a first portion of candidate blocks at first coordinates which are not adjacent to a second coordinate of the current block on the images, and not select a second portion of the candidate blocks at the first coordinates.

16. The electronic device of claim 10, wherein the selected candidate blocks include candidate blocks at coordinates which are adjacent to a coordinate of the current block on the images.

17. The electronic device of claim 10, wherein as the some of the candidate blocks are selected according to the order based on each of the images, a number of candidate blocks selected with regard to each of the images decreases.

18. The electronic device of claim 17, wherein the one candidate block is selected last from the candidate blocks as the number decreases.

19. The electronic device of claim 10, wherein the first electronic circuit is configured to perform first motion estimation to generate the motion vector, and the electronic device further comprises:

a second electronic circuit configured to perform video encoding and decoding based on second motion estimation using at least one hardware component shared with the first electronic circuit to perform the first motion estimation.

20. An electronic device comprising:

one or more processors; and a memory configured to store instructions executable by the one or more processors, the instructions, when executed by the one or more processors, cause the one or more processors to, determine candidate blocks based on a location of a current block without a full search for all pixels with regard to a first decimated image among decimated images, the decimated images being generated from an original image such that the decimated images have resolutions lower than a first resolution of the original image, a second resolution of the first decimated image being a lowest resolution among the resolutions of the decimated images, and decrease a number of the candidate blocks by selecting some of the candidate blocks based on the current block and the candidate blocks with regard to each of the decimated images by referring to the decimated images in order from the first decimated image to the original image such that (i) the candidate blocks selected with regard to a respective one of the decimated images from the first decimated image to the original image are used with regard to a decimated image immediately thereafter, and (ii) the candidate blocks which are not selected with regard to the respective one of the decimated images are not used with regard to the decimated image immediately thereafter.

* * * * *